Oct. 6, 1959 N. D. PRESTON 2,907,980

MULTIPLE STATION CODE COMMUNICATION SYSTEM

Filed June 5, 1953 20 Sheets-Sheet 1

INVENTOR.
N.D. PRESTON

BY Forest B. Hitchcock

HIS ATTORNEY

MULTIPLE STATION CODE COMMUNICATION SYSTEM

Filed June 5, 1953 20 Sheets-Sheet 2

INVENTOR.
N.D.PRESTON
BY Forest B. Hitchcock
HIS ATTORNEY

INVENTOR.
N.D.PRESTON
BY Forest B. Hitchcock
HIS ATTORNEY

INVENTOR.
N.D.PRESTON
BY Forest B. Hitchcock
HIS ATTORNEY

Oct. 6, 1959 N. D. PRESTON 2,907,980

MULTIPLE STATION CODE COMMUNICATION SYSTEM

Filed June 5, 1953 20 Sheets-Sheet 5

INVENTOR.
N.D.PRESTON
BY Forest B. Hitchcock
HIS ATTORNEY

INVENTOR.
N.D.PRESTON
BY Forest B. Hitchcock
HIS ATTORNEY

INVENTOR.
N.D.PRESTON
BY Forest B. Hitchcock
HIS ATTORNEY

MULTIPLE STATION CODE COMMUNICATION SYSTEM

Filed June 5, 1953 20 Sheets-Sheet 8

INVENTOR.
N.D.PRESTON
BY Forest B. Hitchcock
HIS ATTORNEY

MULTIPLE STATION CODE COMMUNICATION SYSTEM
Filed June 5, 1953 20 Sheets-Sheet 9
FIG. 7A. SEQUENCE DIAGRAM CONTROL CYCLE
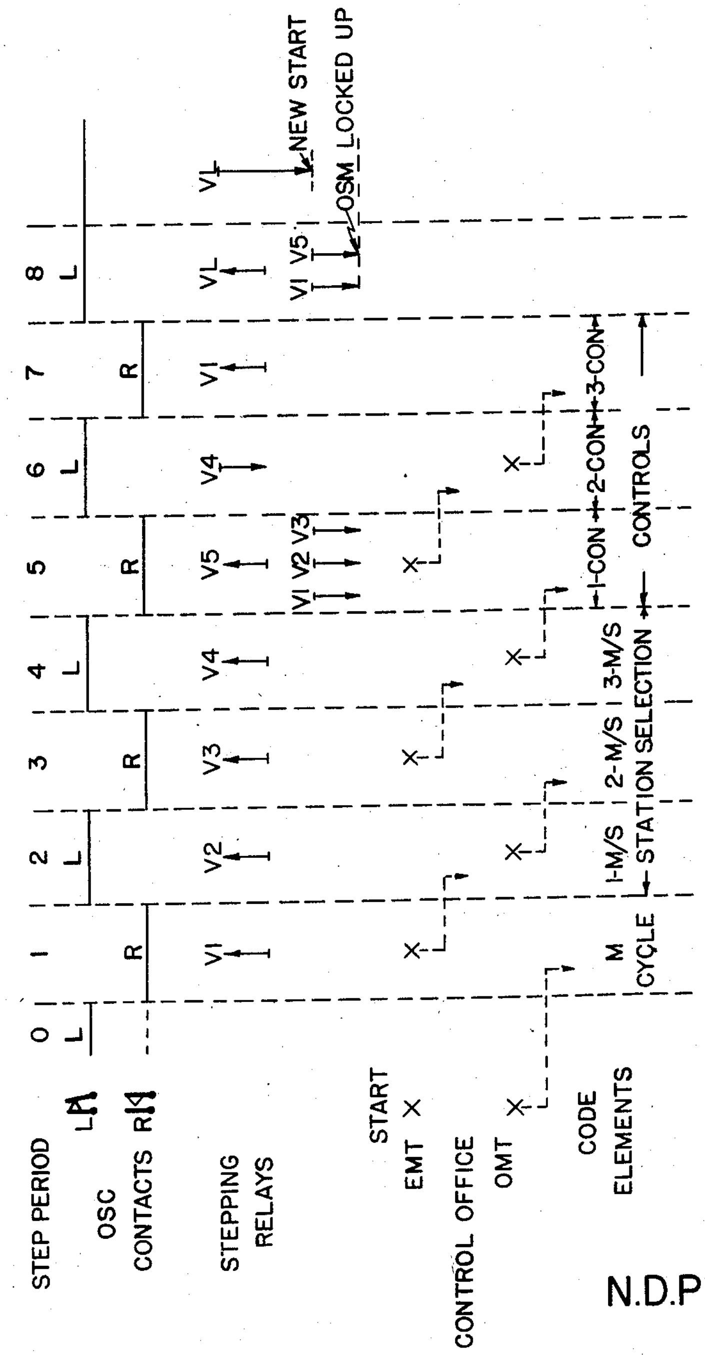
INVENTOR.
N.D.PRESTON
BY Forest B. Hitchcock
HIS ATTORNEY Oct. 6, 1959 N. D. PRESTON 2,907,980

MULTIPLE STATION CODE COMMUNICATION SYSTEM

Filed June 5, 1953 20 Sheets-Sheet 10

INVENTOR.
N.D.PRESTON

BY Forest B. Hitchcock

HIS ATTORNEY

CONTROL TRANSMISSION

INVENTOR.
N.D.PRESTON

BY Forest B. Hitchcock
HIS ATTORNEY

Oct. 6, 1959 N. D. PRESTON 2,907,980

MULTIPLE STATION CODE COMMUNICATION SYSTEM

Filed June 5, 1953 20 Sheets-Sheet 12

INVENTOR.
N.D.PRESTON

BY Forest B. Hitchcock
HIS ATTORNEY

INVENTOR.
N.D.PRESTON
BY Forest B. Hitchcock
HIS ATTORNEY

INVENTOR.
N.D.PRESTON
BY Forest B. Hitchcock
HIS ATTORNEY

INVENTOR.
N.D.PRESTON

BY Forest B. Hitchcock
HIS ATTORNEY

Oct. 6, 1959 N. D. PRESTON 2,907,980

MULTIPLE STATION CODE COMMUNICATION SYSTEM

Filed June 5, 1953 20 Sheets-Sheet 16

INVENTOR.
N.D.PRESTON

BY Forest B. Hitchcock

HIS ATTORNEY

STATION CODE ASSUMED
S-M-S

INVENTOR.
N.D.PRESTON
BY Forest B. Hitchcock
HIS ATTORNEY

Oct. 6, 1959 N. D. PRESTON 2,907,980

MULTIPLE STATION CODE COMMUNICATION SYSTEM

Filed June 5, 1953 20 Sheets-Sheet 18

FIG. 15. OSCILLATOR TIME RELATIONS

INVENTOR.
N.D.PRESTON

BY Forest B. Hitchcock

HIS ATTORNEY

LINE CARRIER

SPACE RADIATION

INVENTOR.
N.D.PRESTON

BY Forest B. Hitchcock
HIS ATTORNEY

*INVENTOR.*
N.D.PRESTON
BY Forest B. Hitchcock
HIS ATTORNEY

United States Patent Office 2,907,980
Patented Oct. 6, 1959

2,907,980

MULTIPLE STATION CODE COMMUNICATION SYSTEM

Neil D. Preston, Rochester, N.Y., assignor to General Railway Signal Company, Rochester, N.Y.

Application June 5, 1953, Serial No. 359,716
23 Claims. (Cl. 340—163)

This invention relates to multiple station code communication systems, and more particularly to a system for rapidly transmitting a series of code elements to constitute station selecting codes and a number of controls and indications to and from a central control office and any selected one of a plurality of remote field locations over a single communication channel afforded by a single line circuit, or by space radiation at a single carrier frequency.

While a code communication system characteristic of this invention is capable of various uses, it is particularly useful in railway signalling for the remote control of power operated track switches and signals at remote interlockings, ends of passing sidings, and the like; and in disclosing the nature of this invention, it is convenient to assume an organization of parts and circuits suitable for such remote control of track switches and signals at a plurality of field locations. Such a code communication system is used to transmit from a central control office to the various remote field locations messages in code, commonly known as controls, in response to the manual actuation of control devices by an operator, so that the operator is able to govern the operation of the track switches and signals of the system as may be necessary from time to time for the operator to exercise supervisory control over the movement of trains. Also, the code communication system is used to transmit automatically to the control office from the various field locations suitable coded messages, commonly called indications, for indicating the existing condition or position of the track switches and signals, and the presence or absence of trains in certain track sections, as and when a change occurs in the condition of these devices, in order that the operator may have the appropriate information for his guidance in supervising train movement efficiently and without objectionable delay.

In one type of such a code communication system, to which this invention more particularly relates, stepping relays at the sending and receiving locations are sequentially operated locally by a releasable and restorable self-propelled time element device, conveniently termed an oscillator, independently of the energization of the line circuit or other communication channel connecting these locations. In other words, in this particular type of code communication system, sometimes known as a syncrostep system, the synchronous operation of the stepping relays at the sending and receiving locations, and the establishing of channel circuits for the transmission and reception of a series of code elements, are accomplished locally upon the release of oscillators at these locations, leaving the line circuit between such locations available for the transmission of intelligence. These oscillators are designed to measure like time intervals, and when simultaneously released at a sending and receiving location, operate the stepping relays at these locations synchronously, with the same effect as if these stepping relays were operated over the line circuit in the manner characteristic of other types of systems.

When a system of this syncrostep type is employed for communication between a number of different locations, such as a control office and a plurality of field locations, there are certain operating conditions to be satisfied which do not apply to transmission as between two locations only. Among other things, where a number of locations are connected by the same line circuit or like communication channel, appropriate facilities are required for selecting the particular locations to send and receive controls or indications during a given operating cycle. In connection with this station selecting for transmission of indications, changes in the condition of the devices at the various field locations to be indicated in the control office are likely to occur at various times in a random fashion; and it is necessary to provide suitable expedients to give such field locations, which have new indications to transmit at the same time, some preference or priority in the use of the communication facilities, at the same time identifying in the control office the field location given the preference and acting to transmit indications.

Such selection of particular field stations to act as sending and receiving locations, either for the transmission of controls or indications, as the case may be, involves the transmission and reception of code elements of station codes assigned to the respective field locations; and such transmission and reception require essentially simultaneous release of the oscillators at all the various locations.

Also, in the syncrostep type of system, the time intervals or step periods for the transmission and reception of code elements are defined at the sending and receiving locations by their local oscillators, and there is no segregated time interval of the line circuit energization, like in systems stepping over the line circuit, for conditioning the means at the sending location to change the character of successive code elements, or changing the apparatus at the receiving location to respond to such code elements, so that there may be faulty reception or crossfire between the successive code elements of different character unless due allowance is made for the operating times of the devices involved in creating and detecting such code elements.

In view of these and other operating conditions relating to a multiple station system of the syncrostep type, the primary object of this invention is to provide a simple, reliable, and fast operating system of this character which will satisfy the various operating conditions encountered in practice.

Generally speaking, and without attempting to define all of the features characteristic of the system of this invention, it is proposed to provide a source of energy at each location of a multiple station syncrostep system for energizing a line circuit or like communication channel to create field and control office starts and the simultaneous release of the oscillators at all locations to initiate control or indication cycles, said source of energy being also employed to determine the character of the code elements to identify control or indication operating cycles, to constitute a station selecting code, and to represent the controls or indications to be transmitted. In the system of this invention, the station selection for both controls or indications to or from a particular field location is obtained by the operation of a station selecting means at each field location, specifically in the form of a stick relay, which is initially energized at the beginning of each operating cycle, and which is jointly controlled in accordance with the particular station code allocated to that location and the station code as applied to the line circuit, so that this relay is maintained energized after transmission of the station code elements at one field location only, dependent upon the particular station code sent from the control office during a control cycle, or the relative code superiority of the station codes of a plurality of field locations happening to have new indications to transmit at the beginning of an indication cycle. In connection with transmission and reception of code elements, it is proposed in the system of this invention to render the line circuit at the sending location effective, by operation of the associated oscillator, to transmit during a given step period the character of code element then prescribed by a transmitting device that was preset during the next preceding step period. Also, in order that the character of the code elements manifested by the condition of the line circuit during a given step period may control a proper corresponding code responsive device, a so-called chopping means is operated by the associated oscillator at the receiving location to provide a message or sampling period, during an intermediate portion of the step period, for actuation of the code responsive device belonging to that step period, thereby permitting the operations of stepping relays, line relay and the like that may be involved in changing the character of successive code elements to occur without tending to cause an unwanted operation of the means responding to the character of such code elements.

Various other characteristic features, attributes and advantages of the invention will be in part apparent, and in part explained in detail as the structural and functional organization of the system and its mode of operation are hereinafter described with reference to the particular physical embodiments illustrated in the accompanying drawings.

In the accompanying drawings, a typical organization of parts and circuits has been illustrated in a simplified and diagrammatic manner in order to facilitate an understanding of the nature of the invention, rather than show in detail the construction and arrangement of parts preferably employed in practice. Various conventional representations and diagrammatic illustrations have been employed in the accompanying drawings in the interests of simplicity. For example, the relays and their contacts are shown in accordance with common conventions, with the contact fingers illustrated either below or above the relay winding, and connected therewith by dotted lines. The contact fingers as illustrated are assumed to move down to an inclined position when the relay winding is deenergized, and to move upward to a horizontal position when the relay winding is energized, establishing a circuit connection to front or back contacts, indicated by arrows, in the upper and lower positions respectively. Arrows and the symbols (+) and (−) are used to designate connections to the opposite terminals of a suitable source of current for energizing the circuits.

In these drawings,

Figs. 1A and 1B are explanatory diagrams of the component elements of the system and their functional relationship for a typical application to the remote control and indications of a simple track layout at a typical field location;

Figs. 2A and 2B, arranged side by side, illustrate in detail the various relays and circuits of the control office apparatus of the code communication system, together with typical associated parts of the control board;

Figs. 3A and 3B, arranged side by side, illustrate in detail the organization of relays and circuits for the apparatus at a typical field station, together with a diagrammatic representation of a simple track layout;

Figs. 7A and 7B are explanatory sequence diagrams for control and indication cycles respectively;

*Functional organization.*—The code communication apparatus at the control office and the various field locations are operatively connected by a suitable communication channel for transmission of codes to and from the control office. In the specific embodiment of the invention illustrated in Figs. 1 to 12, this communication channel is assumed to be a pair of line wires 1 constituting a single line circuit. The distinctive character of the various code elements of the communication code is determined by the condition of energization or deenergization of this line circuit 1 during prescribed stepping intervals allocated to these code elements. A suitable source of energy for providing energization of the line circuit to represent one character of a code element, conveniently termed a "mark," and also for providing automatic starting of the system, is employed at each of the field locations, as well as at the control office. In the specific circuits illustrated, it is assumed that a battery B of the appropriate voltage will be used at the control office and each field station for energization of the line circuit. Similar direct current line circuit energization may be obtained from the ordinary alternating current distribution system, commonly used on railroads, with or without a battery in reserve, by using rectified A.C., or the output of a motor-generator, inverter, or like power unit excited by A.C., as may be expedient or desirable.

Figure 16:
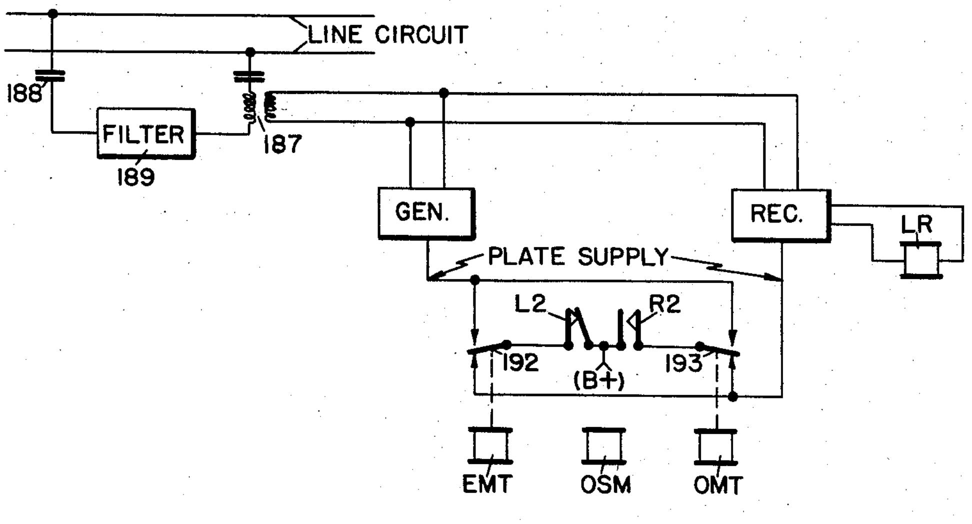
Fig. 16 is a functional diagram showing a modified form of a line carrier communication channel as between the control office and the various field locations.
Figure 17:
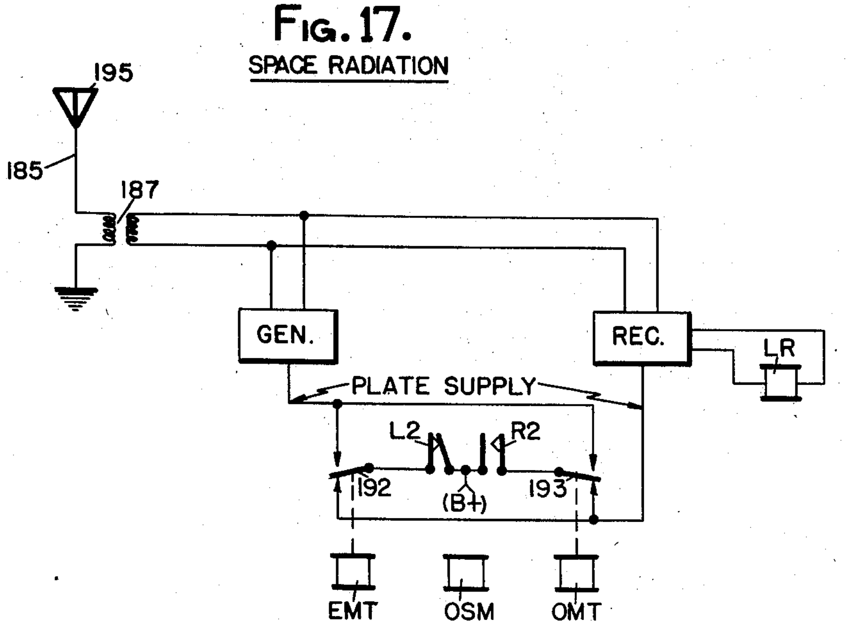
Fig. 17 is a functional diagram of a further modification using a radio or space radiation communication channel as between the control office and the several stations.

This invention, however, is not limited to the D.C. energization of a line circuit; and as indicated in Fig. 16, the marks and spaces for the code elements of this system may be formed by controlling the energization of the line circuit with a carrier frequency. Also, as indicated in Fig. 17, the desired code elements may be transmitted without a line circuit by radio or space radiation. Further, the system is not limited to the use of energized and deenergized conditions of the communication channel, i.e. marks and spaces, to give distinctive character to the code elements; and by appropriate modification of the transmitting and receiving devices, variations in polarity or frequency may be used to give distinctive character to the code elements. In short, the D.C. energization of a line circuit by batteries to form marks and spaces as specifically illustrated in Figs. 1 to 12 is merely one typical embodiment of the invention.

In this embodiment of the invention illustrated, a line relay LR to respond to the character of the code elements is connected across the single line circuit at the control office and each field station, leaving the line circuit intact for other power or communication facilities. This line relay LR is preferably of the sensitive fast operating type, such as disclosed in the patent to O. S. Field, No. 2,617,-846, November 11, 1952.

The primary purpose of this code communication system is to control, and also indicate the position or condition of devices, such as power operated track switches and signals; and the need for communication as between the control office and the field locations arises from time to time as the operator finds it expedient to control these remotely located devices, or some change occurs at the field stations which calls for communication of useful indicating information back to the control office. Under such conditions, continuous code communication is not needed, and the system of this invention is of the start-stop type, which is normally inactive or at rest, and is automatically set into operation for transmission of controls by the operator's manipulation in the control office, or for transmission of indications by field starts occurring automatically whenever there is a change in the condition or position of the track switches, signals, or track circuits, which calls for the transmission of up-to-date indications to the control office for the information of the operator.

In systems of this character, the new controls or indications to be transmitted at a given time involve as a rule only one of the field locations, and it is expedient to establish communication as between the control office and the several field locations on a time sharing basis, devoting part of each operating cycle to the selection or identification of the particular field location to receive controls, or transmit indications, as the case may be, during that operating cycle. In this connection, since conditions calling for the transmission of new indications may arise concurrently at the various field locations, particularly in the case of train movement into and out of track sections, it is necessary to provide a station selecting means, which will operate automatically to limit the transmission of indications from such field locations one at a time, in accordance with some prescribed preference or priority. In a system of this invention, as later explained in detail, the field stations ready to transmit new indications do so one at a time during successive operating cycles in a sequence determined by the station selecting codes allotted to these field stations, in accordance with the principle of so-called code superiority.

The system of this invention is of the so-called simplex type, and is capable of transmitting during a given operating cycle either controls or indications, but not both, with respect to a selected field station. Since the changes calling for transmission of new indications and field starts may occur at any time in a random fashion, and some field station may have new indications to transmit at the same time the operator wants to use a system for transmission of controls to some other station, it is necessary to identify each operating cycle by suitable means at the control office and at each field location as one involving the transmission of controls, or the transmission of indications, as the case may be, for the purpose of conditioning the code transmitting and receiving apparatus at these points accordingly, otherwise there would be a hopeless jumble of code elements if the control office should be sending codes to some one field station at the same time some other field station is trying to send indications to the control office. Also, it may happen that an automatic field start will occur simultaneously with a manual start by the operator at the control office; and the system should be capable of conditioning the apparatus at all transmitting and receiving points to provide for the transmission of either controls or indications during the next operating cycle, even in the contingency of simultaneous control office and field starts.

It may be pointed out here that the apparatus and circuits are arranged, as later explained in detail, so that the character of the first code element during an operating cycle conditions the apparatus at the field locations for the reception of controls, or the transmission of indications, and this code element is given the particular character (i.e. a mark) to designate a control cycle if a relay at the control office can be energized by manipulation of the operator, before the line relay at the control office has responded to a field start.

In systems of the character under consideration, the character of each code element of a code is determined by the condition of the communicating channel, i.e. the energized or deenergized condition of the line circuit, during particular intervals of time allocated to the respective code elements. In the system of this invention, such time intervals are determined by like self-propelled time interval measuring devices, conveniently termed oscillators, which are located respectively at the control office and each field location. These oscillators are simultaneously released upon energization of the line circuit while the system is at rest, and thereafter operate locally and independently to measure off the stepping periods or time intervals relating to the respective code elements. Each oscillator causes the sequential operation of the relays of a bank of counting or stepping relays at the corresponding location to set up distinctive circuit paths, conveniently termed channel circuits, for permitting operation of the transmitter at that location when sending to control the energization of the line circuit to give the desired character to the individual code elements of a series during an operating cycle. The same bank of stepping relays sets up similar channel circuits for registering the character of the code elements when the station is receiving the code being transmitted from some other station. The relays of the stepping banks at all the locations, when thus locally operated by the oscillators, establish channel circuits for transmitting and receiving each one of the code elements in the desired synchronous time relationship, with certain limitations discussed more in detail later.

In a system of this invention, the oscillators at the respective stations are also used to render the energized or deenergized condition of the line circuit dependent upon the pre-set condition of transmitter relays. Such pre-setting of even and odd mark transmitter relays EMT and OMT is an important feature of this invention, because it permits changing the character of successive code elements without any intervening period for transmitter relay operation. Also, the local oscillator at each receiving station is employed in the system of this invention to operate so-called chopping relays EC and OC in a manner to utilize properly the character of the successive code elements for the control of station selection relays, and code registration, as discussed more in detail later.

Before considering in detail the specific arrangement of relays and circuits illustrated for accomplishing the functions just described, it is convenient to outline the function and general structural organization of some of the component elements of the system, particularly since some of these elements are well known parts of other types of systems, and may take any one of the conventional forms in practicing the invention.

Figure 1A:
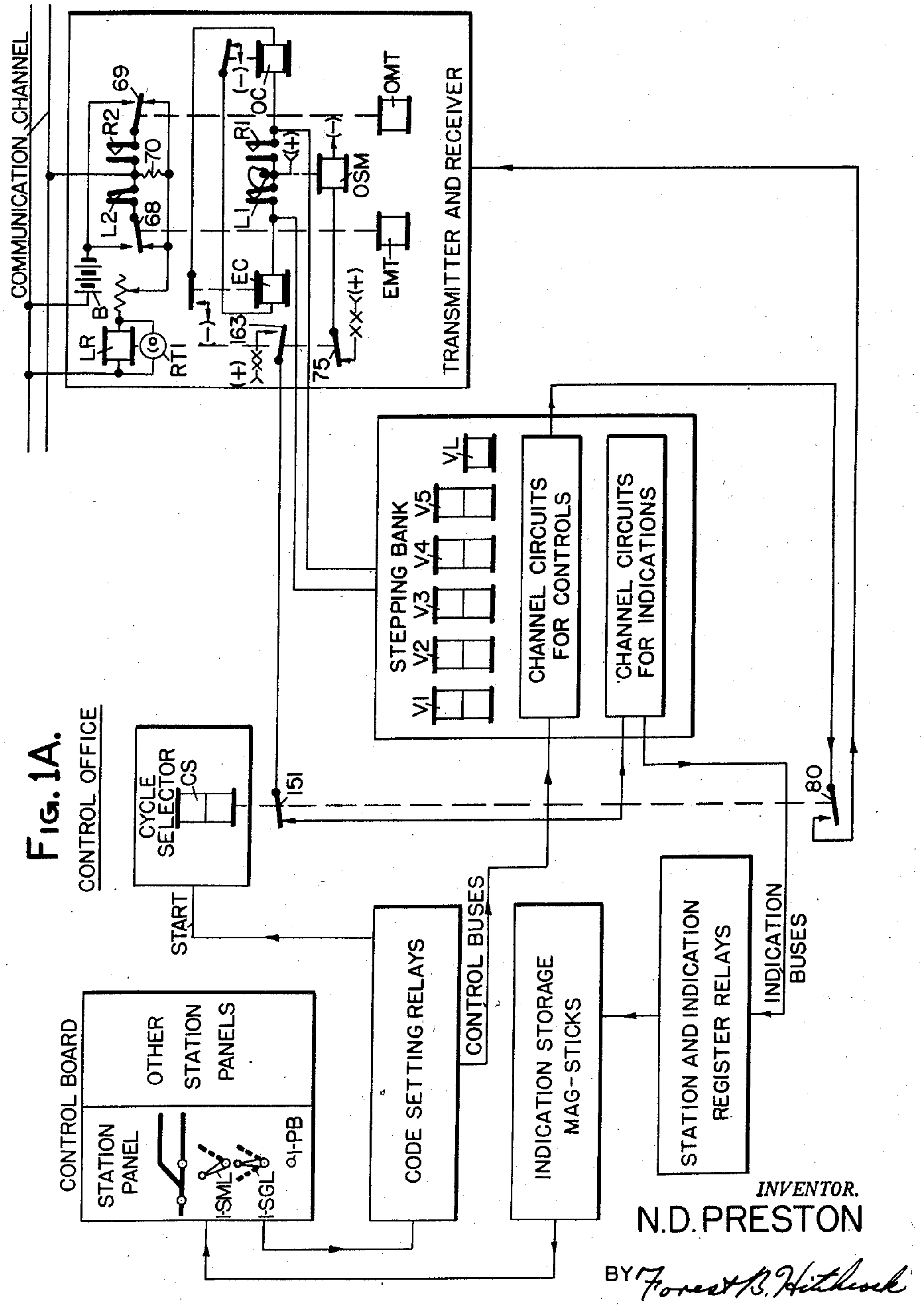
Figure 1B:
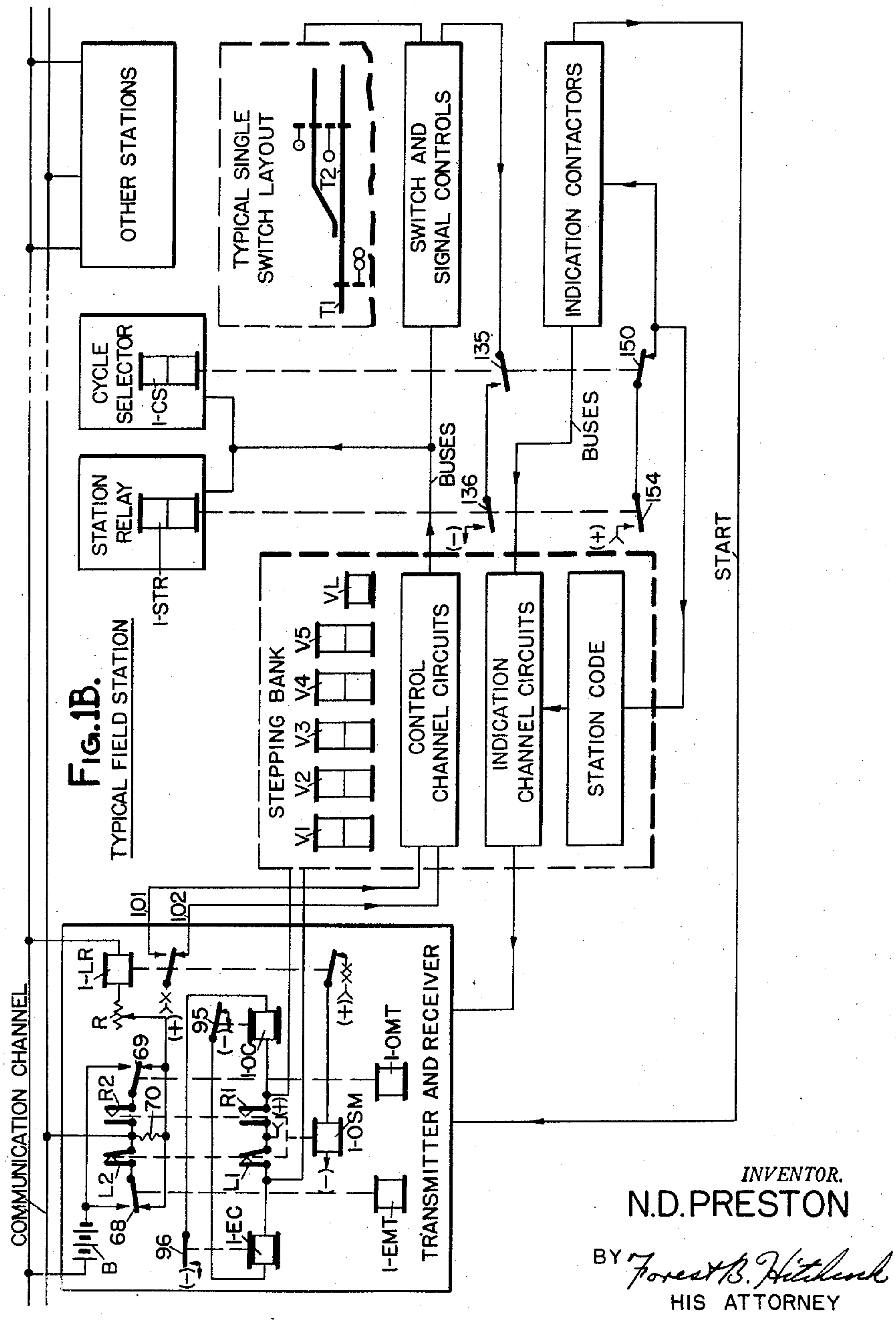

*System elements.*—The component elements of this system from the standpoint of purpose and function are diagrammatically represented in Figs. 1A and 1B.

A simple track layout is assumed for the various field locations, comprising a single power operated track switch, and the usual associated signals for governing train movement, together with a number of track sections, such as a detector track section, and an approach track section. The same principles and mode of operation of the code communication system as illustrated may be readily adapted to different track layouts that may be encountered in practice at the field location, by suitable duplication of parts and circuits, or the appropriate re-arrangement of the specific circuit connections shown, in a manner that will be obvious to one skilled in the art.

Referring to Fig. 1A, which diagrammatically represents the component elements of the system in the control office, the usual control board includes a miniature diagram of the track layout under the supervision of the operator, track occupancy indicating lamps (usually located on this track diagram), suitable switch and signal control levers, and manually operable starting means for initiating a control cycle. The control levers and indicating lamps relating to the track layout of a given field location are usually grouped together on a so-called lever panel. In accordance with common practice, the switch lever SML may be set to "normal" and "reverse" positions, and the signal lever SGL in a central "stop" position, or in a "right" or "left" position to clear signals permitting train movement to the right or left. The indications of switch position and signal indicating condition may be displayed by lighting so-called correspondence lamps associated with the switch and signal levers, or by lighting other lamps, positioning switch point indicators, or by other expedients suitable for conveying the desired information to the operator.

In the arrangement illustrated, it is assumed that the operator, after setting the switch lever SML and signal lever SGL to the positions desired, will initiate operation of the system to transmit control codes for the lever panel in question by actuating a start push button PB. Since the system is capable of transmitting controls to only one field location during a given operating cycle, a group of code setting relays, one for each field station, is arranged to be controlled by actuation of the start push buttons of the respective lever panels, in a manner to bring about code transmission of the appropriate station selecting code and control code elements for one lever panel at a time. A master relay LCS of this code setting relay group controls the energization of a cycle selector relay CS subject to prior energization of the line relay LR in the control office by a field start. The condition of this cycle selector relay CS conditions the apparatus in the control office for transmission of controls, or reception of indications.

The oscillator, bank of stepping relays, and the odd and even transmitter relays EMT and OMT are represented diagrammatically in Fig. 1A. As previously indicated, one function of the oscillator, when released by energization of the line relay LR, is to cause sequential operation of the relays of the stepping bank to set up the channel circuits for controls, and other channel circuits for indications.

In the case of a control cycle, the cycle selector relay CS is energized, and the channel circuits for controls are effective to connect control buses (dependent upon the particular station code setting relay then energized), to the relays EMT and OMT of the transmitter, thereby applying a code to the line circuit for selecting the corresponding field station, and transmitting to that field station the particular switch and signal controls for the existing position of the corresponding switch and signal levers.

In the case of an indication cycle, the cycle selector relay CS is deenergized, and the energization of the line relay LR, in response to code elements applied at one (or more) field stations, is distributed by the channel circuits for indications set up by the stepping relay bank to a group of station and indication register relays. This group of relays registers the station code for the particular field station then effective to transmit new indications (sometimes the surviving station of a group of stations ready to send new indications), and also registers the character of the code elements relating to the indications being received from such field location.

The lighting of the indication lamps on the control panel is controlled by groups of indication storage relays, one for each lever panel. These indication storage relays are preferably of the so-called mag-stick type, such as disclosed, for example, in the patent to Willing et al., No. 2,535,977, December 26, 1950.

At the end of the indication cycle, the new indications as set up on the indication register relays are transferred during an execution period to the particular indication storage mag-stick relays for the particular lever panel identified by the station registration relay.

Fig. 1B illustrates diagrammatically the component elements for a typical field station. In this connection, it should be understood that the code communication apparatus is essentially the same in this system at all of the field locations, and is designed to provide a certain number of controls and indications suitable for the particular installation, which may, or may not be used as needed to satisfy the control and indication requirements for the respective field locations. If the track layout at a given location in the field calls for more controls and/or indications than can be handled by such standard field station apparatus, duplicate apparatus with different station codes may be employed to operate on the same time sharing basis the same as if physically located at different field locations.

The typical field station illustrated is assumed to be the No. 1 station of the system, and for convenience the prefix number 1 is used with the letter designations for certain relays and other parts, so as to distinguish from like devices at the control office and other field stations, e.g. relays 1–LR, 1–CS, 1–EMT, etc.

The typical field station apparatus shown includes an oscillator, a transmitter having even and odd transmitter relays 1–EMT and 1–OMT, a bank of stepping relays operated by the oscillator to set up control channel circuits and indication channel circuits, and a line relay 1–LR, much the same as the control office. The field station apparatus also includes a similar cycle selector relay 1–CS, which in the case of the field station is energized by the "mark" character of the first code element received.

A single station relay 1–STR performs the station selection function for both controls and indications. This station relay is initially energized at the beginning of each operating cycle, and is automatically controlled by the line relay, as later explained in detail, to be maintained energized only so long as the code elements being received match the station code allocated to the field station in question. When station relay 1–STR is thus energized, the station in question is capable of receiving subsequent code elements relating to controls, if the cycle selector relay 1–CS is energized for a control cycle. Under such conditions, the energized or deenergized condition of the line relay 1–LR, as manifested by the closure of its front contact for a "mark," or its back contact for a "space," is sequentially applied through the control channel circuits of the stepping relay bank to the appropriate switch and signal control relays.

Whenever a change occurs in the existing position or condition of the track switches, signals, or track circuits to be indicated, suitable indication contactors associated with these devices are operated to bring about a field start over the functional "start" connection to the transmitter. If more than one field station has new indications to transmit, the station relays such as 1–STR at such stations are controlled in a manner later explained, so that such field stations allocated so-called inferior code calls automatically drop out by the release of their station relays STR, leaving only one field station with its station relay energized. Under these conditions, the indication contactors at the particular surviving field station are effective to control the transmitter relays 1–EMT and 1–OMT over the indication channel circuits through the latter part of the indication cycle.

This discussion of the elements of the system as diagrammatically represented in Figs. 1A and 1B, together with a brief explanation of their purpose and function, indicates generally the plan of operation of the system. In this connection, the specific arrangement of parts and circuits illustrated and later described represents only one specific way of performing these functions; and as the circuits and operating sequences are explained in detail, it will be apparent to one skilled in the art how the specific parts and circuits illustrated may be modified in several instances, in accordance with well known practice, and still accomplish the desired results.

*Operation*

Before describing in detail the circuits and the particular operating sequences involved under the various operating conditions, it is convenient to explain separately the mode of operation of some of the component elements of the system.

*Control office start.*—Referring to the group of code setting relays in the control office, various arrangements of relays and circuits known in the art are suitable for this purpose. Referring to the particular organization of relays and circuits illustrated in the upper left-hand part of Fig. 2A, actuation of push button 1–PB establishes a circuit from (+), through back contact 4 of a master relay LCS, bus 5, push button 1–PB, relay 1–LC, to (−). Relay 1–LC, thus energized by a momentary actuation of its push button 1–PB, is maintained energized by a stick circuit which may be traced through a back contact 6 of a relay VL (actuated at the end of an operating cycle) in multiple with a back contact 7 of cycle selector relay CS (energized during a control cycle), wire 8, master relay LCS, back contact 9 of relay 2–LC for the other lever panel illustrated, as well as through similar back contacts (not shown) of the relays LC of all other lever panels, front contact 10 of relay 1–LC, winding of this relay, to (−).

It can be readily seen that the energization of the master relay LCS in the stick circuit for the relay, such as 1–LC, which is first energized by push button actuation, opens at the back contact 4 of this master relay LCS the energizing circuits for the relays LC of all other lever panels. In the event that the two start push buttons, such as 1–PB and 2–PB shown, are accidentally or carelessly actuated at exactly the same time, the energization of relay 2–LC and opening of its back contact 9 breaks up the stick circuit for the other relay 1–LC, and opening of the back contact 4 of the master relay LCS breaks up the pick-up circuit for this other relay 1–LC, so that only one relay is left energized. The same result would occur in the event of simultaneous actuation of any other two start push buttons on the control panel.

The code setting relay, such as 1–LC, which is energized for a given control cycle, is restored to normal at the end of that cycle when relay VL is energized in the manner later described to open its back contact 6, while cycle selector relay CS is energized to open its back contact 7. An indicating lamp LT may be lighted through front contact 4 of master relay LCS, to indicate when actuation of a start push button has been effective to energize a code setting relay LC, and also indicate when that actuation of a start push button would be proper and effective.

The energization of a code setting relay such as 1–LC closes a number of front contacts to make the energization of a set of control buses CB dependent upon the existing position of the control levers of the corresponding lever panel, and also the particular station code allocated to this lever panel. In the arrangement illustrated, it is assumed that a composite code of three code elements, designated 1–M/S, 2–M/S, and 3–M/S, will be used for station selection, and three code elements designated 1–CON, 2–CON and 3–CON will be used for controls. Accordingly, the upper three contacts of a code setting relay such as 1–LC are connected to contacts of the switch and signal levers SML and SGL on the lever panel in question, and the lower three contacts are connected to terminals for code jumpers to provide the desired mark or space character of the station selecting code elements. If a code jumper connects these terminals, a corresponding code bus is energized, and a mark is transmitted for the corresponding code element.

*Field starts.*—The means for detecting a change in the various devices at a field location to be indicated in the control office, for the purpose of initiating an automatic field start of the system, may take various forms. The particular arrangement of relays and circuits shown in lower part of Figs. 3A and 3B involves well known expedients, and is merely typical of a circuit organization suitable for this purpose. In this type of field start circuits, a so-called change relay, designated 1–CH for the typical field station illustrated, is normally maintained energized by a stick circuit through its front contact 12, and front and back contacts in multiple of contactors associated with each of the devices at the corresponding field locations to be indicated in the control office. Contactors 13 and 14 of this kind are shown for two track relays 1–TR and 2–TR for two of the track sections of the track layout assumed. The contactors for the other devices to be indicated which are also included in this stick circuit for relay 1–CH, are indicated by crosses at 15.

If track relay 1–TR, for example, is either steadily energized or deenergized, the stick circuit for relay 1–CH is maintained. Whenever this track relay changes from its existing position, however, either dropping or picking up, this stick circuit for relay 1–CH is momentarily interrupted. The same is true for changes in the position or condition of other devices to be indicated. In this connection, the relay 1–CH is designed for quick operation to release and open its front contact during such momentary interruption of its stick circuit.

Such deenergization of relay 1–CH by any change in the devices to be indicated, and closure of its back contact 16 establishes a pick-up circuit for a repeater relay 1–CHP, which may be traced from (+), through said back contact 16 of relay 1–CH, wire 17, a back contact 18 of a cycle distribution relay LCP, winding of relay 1–CHP, to (−).

The repeater relay 1–CHP, once energized, is maintained energized until an indication cycle has occurred for the particular station in question, by a stick circuit which includes front contact 20 of relay 1–CHP, wire 21, a multiple arrangement of contacts comprising a back contact 22 of a station relay 1–STR, front contact 23 of a control cycle relay 1–CS, and a back contact 24 of a relay VL. When relay VL is temporarily energized at the end of an operating cycle, and opens its back contact 24, if this cycle involves the particular field station, station relay 1–STR is also energized at the time by reason of circuits later described, and the front contact 23 of the cycle selector relay 1–CS is open (indication cycle), with the result that the repeater relay 1–CHP is automatically released.

While relay 1–CHP is energized, a circuit more conveniently described in detail later is established through its front contact 25, which tends to initiate an indication cycle as soon as the system is free for code transmission.

The energization of this relay 1–CHP, and closure of its front contact 27 establishes a pick-up circuit including wire 28 and readily traced on the drawings which energizes and maintains energized relay 1—CH, since any changes in the devices to be indicated subsequent to the energization of the change repeater relay 1—CHP will be included in the indications transmitted to the control office as and when the field station in question gets a chance to transmit indications. In other words, once a change calling for transmission of indications has been stored by the energization of the repeater relay 1—CHP, further actuation of the change relay 1—CH by momentary interruption of its stick circuit is unnecessary. When relay 1—CHP releases, the change relay 1—CH is again sensitized, so to speak, to respond to any subsequent change in the devices to be indicated.

In connection with this feature of automatic field starts, the disclosure of the invention also includes an optional refinement, conveniently termed cycle distribution. It may happen that some fault develops which causes a given field station to assume a condition calling for repeated field starts and transmission of indications from that station. The field stations are given a preference or priority for the transmission of indications, in a manner later described. Thus, such a fault at a given station would bring about a transmission of indications from that station in preference to other inferior stations, thereby blocking the reception of useful indications from such other inferior stations. The so-called cycle distribution scheme is intended to remedy this condition.

Figure 3A:
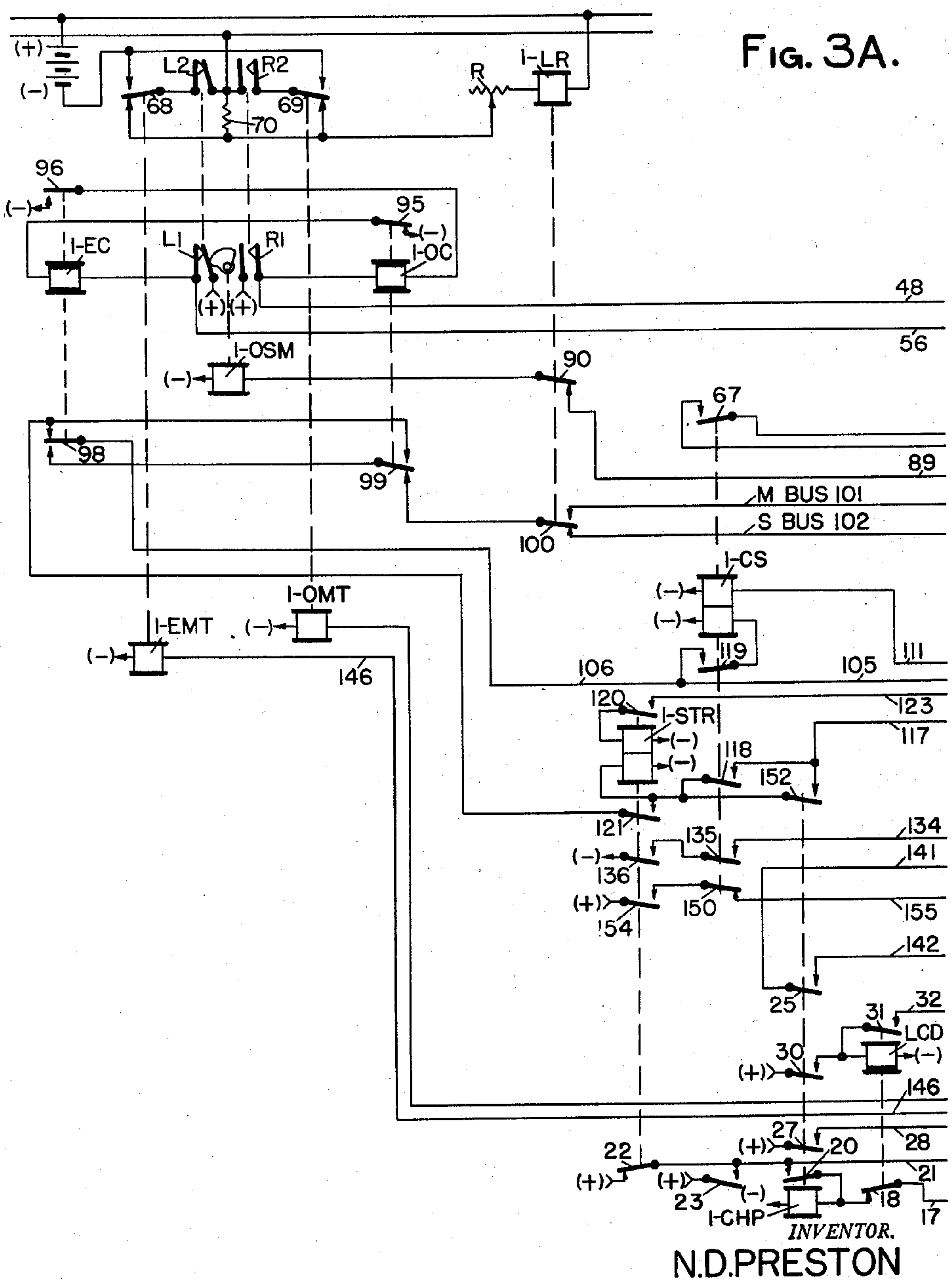

Referring to Fig. 3A, energization of the relay 1—CHP to cause a field start is not possible while the cycle distribution relay 1—CD is energized and has its back contact 18 open. This relay 1—CD is constructed to have a suitable time delay in its release, such slow-acting characteristics being indicated conventionally. When the change repeater relay 1—CHP is energized, it establishes through its front contact 30 an energizing circuit for the cycle distribution relay 1—CD. This relay 1—CD also has a stick circuit through its front contact 31, wire 32, and a front contact 33 of a stepping relay V2. The relay V2, as later explained, is energized for a time during each operating cycle of the system.

The net result of this circuit organization is that, after the field station in question has brought about a transmission of indications by energization of its change repeater relay 1—CHP, the system must be inactive for a prescribed time interval before relay 1—CD assumes its deenergized position to close its back contact 18 and permit another energization of relay 1—CHP, and a subsequent field start from the particular field station. During such interval, any other field stations having new indications to transmit have a chance to use the communication system without being interfered with by repeated field starts from a defective station with a superior station code. In short, the indication cycles from the various field stations are automatically distributed, so to speak, in a manner to avoid loss of indications from a field station or stations, in the event of a fault and persistent field starting at a superior station.

Figures 4, 5:
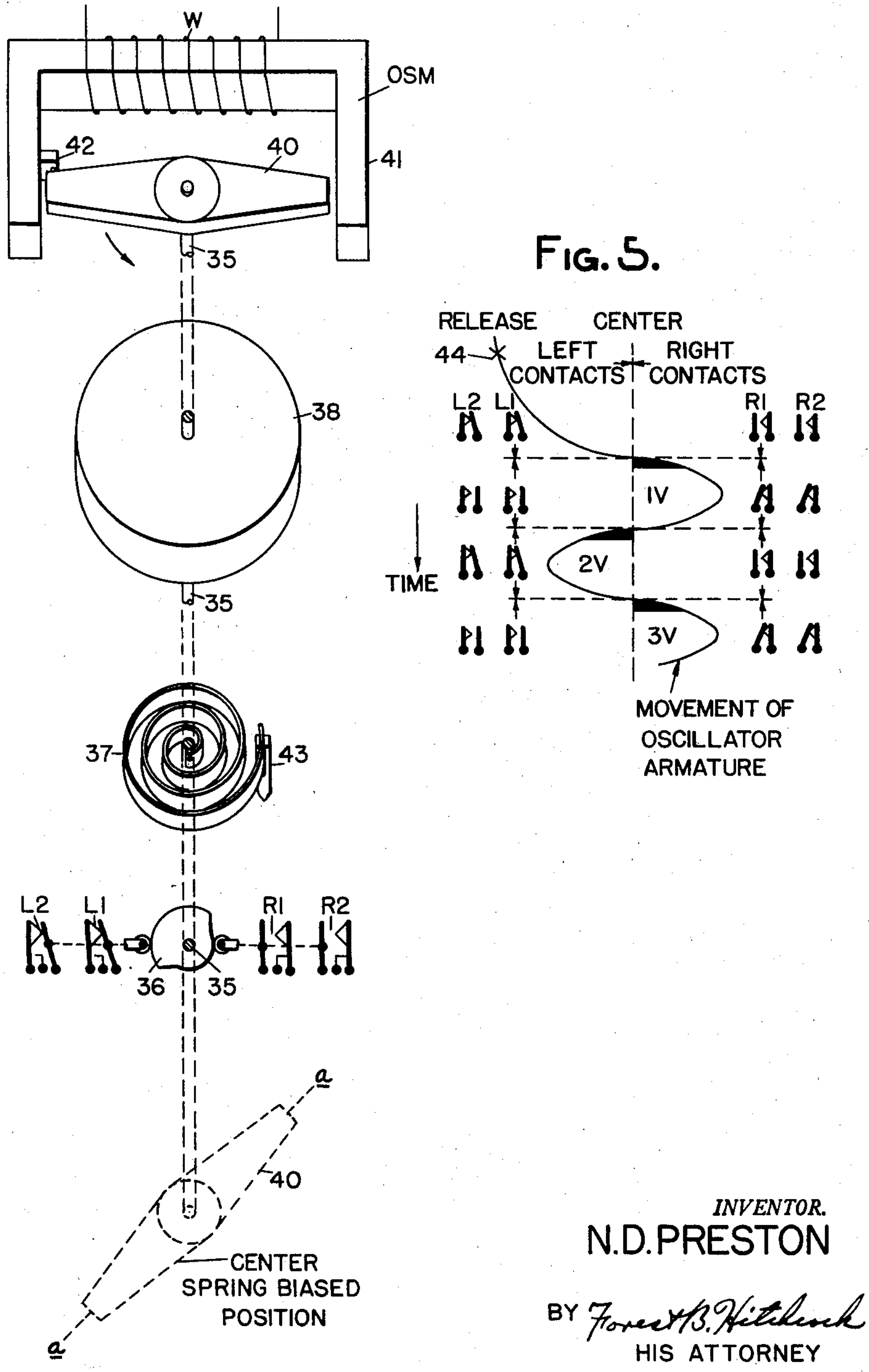
Fig. 4 is a simplified diagrammatic illustration of the type of releasable and self-propelled oscillator used at the various transmitting and receiving points in the system.
Fig. 5 is an explanatory diagram of the operating characteristics of the oscillator of Fig. 4.

*Oscillator and stepping relays.*—The type of oscillator preferably employed for local operation of the relays of a stepping bank, and for performing other useful functions in the system of this invention, is diagrammatically illustrated in Fig. 4. This device is essentially a releasable and restorable torsional pendulum, which measures time intervals with a high degree of accuracy like the ordinary pendulum or balance wheel of clocks and watches.

As shown, the oscillator comprises a shaft 35 supported on suitable antifriction bearings (not shown), preferably vertically. To this shaft 35 are fixed a contact operating cam 36, a heavy spiral spring 37, a disclike pendulum weight 38, and an armature 40 of an operating magnet OSM having a core 41 and winding W.

When the winding W of the oscillator operating magnet OSM is energized, the armature 40 is attracted to and held in the position shown. A stop 42 is preferably used to determine this normally inactive position of the armature 40 and shaft 35. The spring 37 tends to cause the shaft 35 to assume an intermediate position indicated by the line *a—a* and the dotted position of the armature 40 in the lower part of Fig. 4. The contact operating cam 36 engages rollers connected to the spring contact fingers of two pairs of contacts, and a turning movement of this cam causes these movable contact fingers to be quickly shifted into and out of engagement with fixed contacts in a manner readily understood.

The parts of the oscillator are shown in Fig. 4 in the normal inactive position existing while the communication system is at rest. When the winding W of the oscillator magnet OSM is deenergized in connection with initiating operation of the code communication system, the spring 37 rocks the shaft 35 counterclockwise in the direction indicated by the arrow toward the spring biased center position indicated by the line *a—a*. As can be readily understood, the pendulum weight 38 thus accelerated swings the shaft 35 beyond this center position, whereupon the spring 37 is put under tension to swing the shaft back toward this center position. The net result is that the shaft 35, armature 40, and the contact operating cam 36, oscillate about the center position (indicated by the line *a—a*) at a prescribed rate determined by the mass of the pendulum weight and other parts, and the accelerating force of the spring 37. These oscillations are damped by friction and the contact operating load, but the parts may be readily proportioned to provide the desired number of free oscillations for an operating cycle in a station selecting system of this character.

After a predetermined number of such free oscillations for an operating cycle, and a corresponding number of stepping relay operations, the oscillator magnet OSM is again energized, and its armature 40 is attracted to, and held in, the normal inactive position shown, ready for the next operation of the system.

The contact operating cam 36 is shaped to cause operation of the oscillator contacts at the time the shaft 35 and armature 40 pass through the center spring biased position *a—a*, so that the time intervals at which these contacts are shifted remains the same during the period of free oscillation, even though the amplitude of such oscillations may decrease.

The time intervals measured by such contact operation of this type of oscillator may be adjusted by changing the tension of the spring 37. This is conveniently accomplished by adjusting the spring anchorage device indicated at 43. The different oscillators used at the various stations of the system may be thus adjusted to measure off the same stepping time intervals with a high degree of accuracy for the limited number of free oscillations involved.

The explanatory diagram of Fig. 5 illustrates the condition of the oscillator contacts with relation to the swinging movement of the oscillator shaft and armature. It is convenient to think of the oscillator as a pendulum, locked up to the left, and having left and right swings past a center position. When the oscillator is in its normal inactive position shown, the pair of left contacts L1 and L2 are closed, and the other pair of right contacts R1 and R2 are open. When the armature of the oscillator is released, as indicated at 44 in Fig. 5, and passes through the center position *a—a*, the left contacts L1 and L2 are opened, and the right contacts R1 and R2 are closed. When the oscillator again swings through its center position at the end of its swing to the right, the right and left contacts are again operated to their initial positions. This same alternate opening and closing of the right and left contacts of the armature at equal time intervals is repeated until the oscillator is restored by reenergization of the oscillator magnet OSM. Each time the oscillator swings through the center position one of the stepping relays V1, V2, V3, etc. is operated, as indicated in Fig. 5.

In this system, the oscillators at the various stations when released measure off by operation of their contacts equal time intervals, and are used as the primary timing devices for stepping relay operation, transmission presetting and reception of code elements, and other functions. To facilitate an explanation and understanding of the operating sequences and time relationship of the various operations of the system, the sequential operation of the stepping relays and other functional results are illustrated in the time charts of Figs. 7A and 7B for control and indication cycles respectively, in their relationship to the time intervals defined by oscillator operation. It may be considered that these time intervals relate to even and odd periods, numbered 1, 2, 3, etc. following an initial or 0 period for control office or field starts and transmitter relay pre-setting for the first cycle designating code element. The sequence of relay operation is indicated on these time charts by arrows representing relay pick-up and release. The time periods when the transmitter relays EMT and OMT are effective respectively to control the energization of the line circuit is indicated by X on these charts; and the periods for receiving the various control elements are also indicated by using the characters 1M/S, 2M/S and 3M/S for the mark or space station selecting code elements, 1–CON, 2–CON and 3–CON, for control code elements, and 1–IND, 2–IND, etc. for indication code elements.

Figure 6:
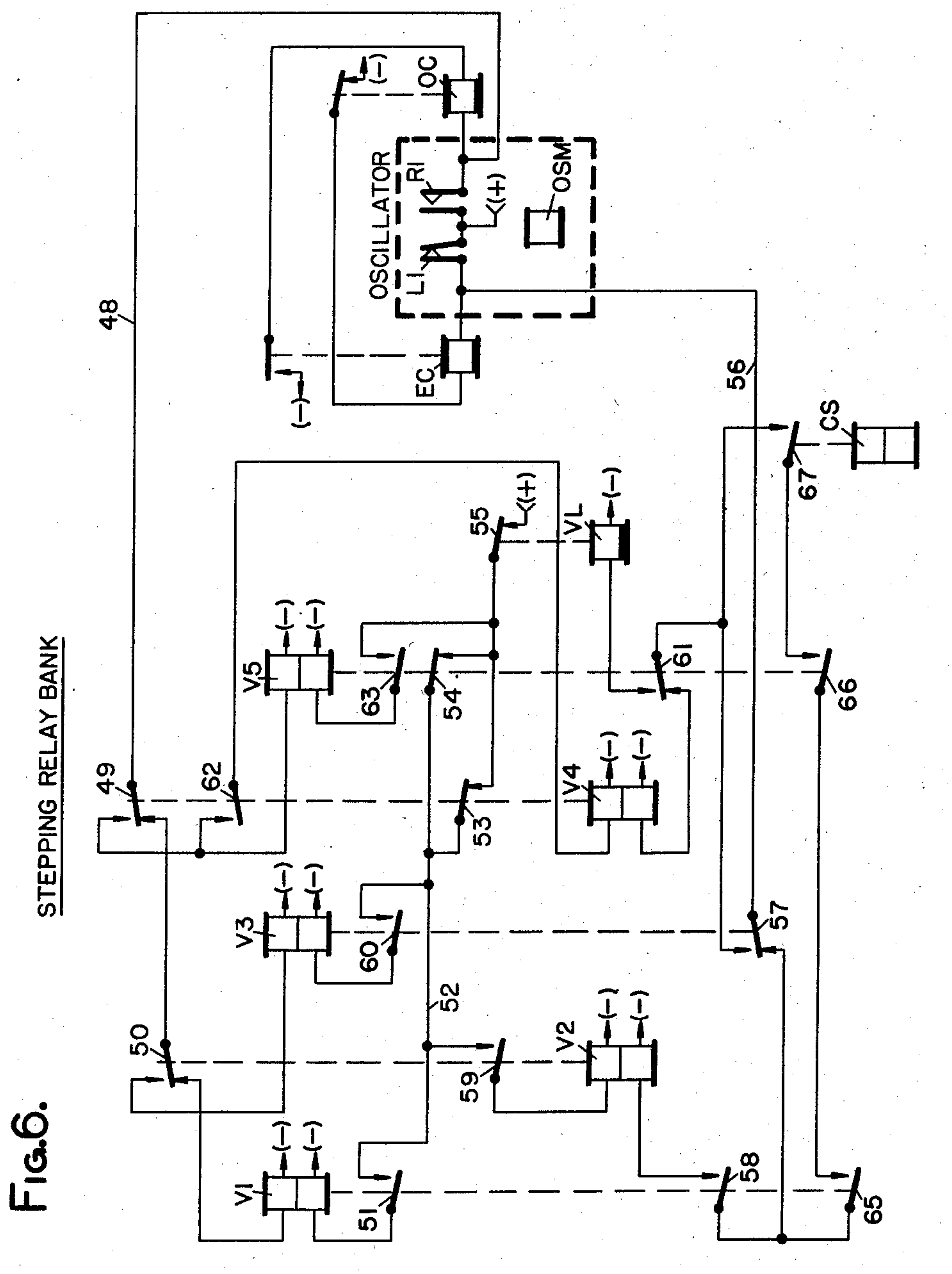
Fig. 6 shows separately the relays and circuits of the stepipng relay bank.

*Stepping relay operation.*—The circuit organization for the particular type of relay stepping bank assumed and illustrated is shown separately in Fig. 6. This stepping bank comprises five stepping relays V1 to V5, arranged to be sequentially energized one at a time with a repeat operation of certain relays, and is capable of setting up nine distinctive channel circuits (see Fig. 7B). A relay VL, preferably with slow release characteristics, is energized by operation of the oscillator upon completion of the number of steps allocated to an operating cycle. This relay VL acts to restore the various relays and circuits of the associated station apparatus to the normal inactive condition.

Figure 7B:
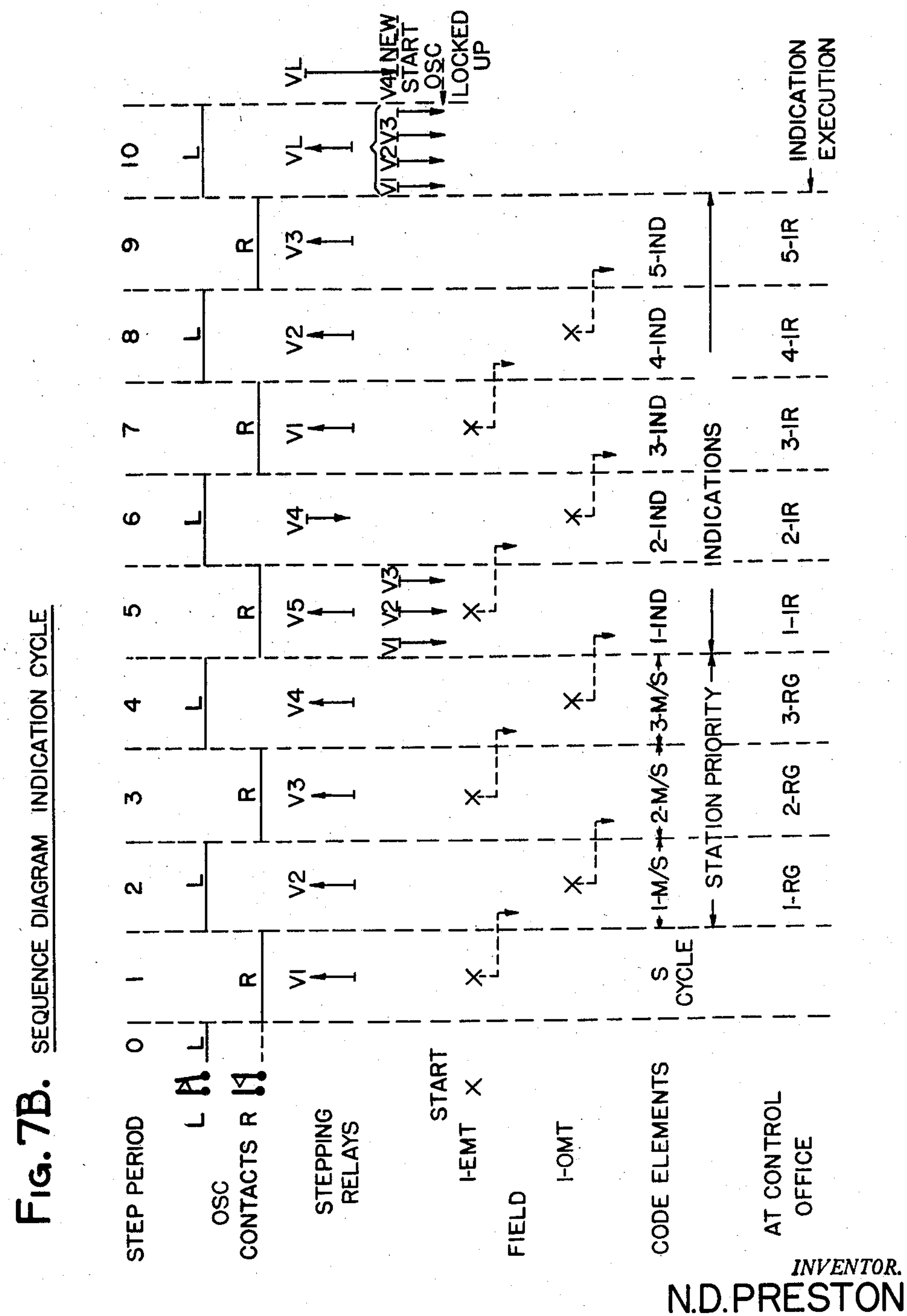

In this connection, the number of code elements ordinarily required for the transmission of indications in a typical railway signalling installation is larger than the number of code elements needed for the control of switches and signals, and it is expedient to control relay VL so as to give control and indication cycles of a different number of steps, as indicated in Figs. 7A and 7B.

Briefly describing the circuit connection shown in Fig. 6 for producing the sequence of stepping relay operation illustrated in the time charts of Figs. 7A and 7B all the stepping relays V1–V5 and the relay VL are deenergized in the normal inactive condition of the system. When the oscillator is released and its right-hand contacts R1 close, current flows from (+), over wire 48, back contacts 49, 50 of relays V4 and V2, through the upper winding of first step relay V1. This relay V1 is maintained energized by a stick circuit through its front contact 51 to a stick bus 52 connected through back contacts 53 and 54 of relays V4 and V5 in multiple, back contact 55 of relay VL, to (+). Thus, as indicated in Figs. 7A and 7B, the first step relay V1 remains energized until relays V4 and V5 are both picked up.

When the oscillator swings past center for step period 2, and its left contacts L1 close, a pick-up circuit for the next stepping relay V2 is established from (+), oscillator contacts L1, wire 56, back contact 57 of relay V3, front contact 58 of relay V1 (now closed), and lower winding of relay V2, to (−). Relay V2 is maintained energized by a stick circuit through its front contact 59 connected to the stick bus 52.

On the next swing of the oscillator, for step period 3, and closure of its contacts R1, the next stepping relay V3 is energized by a circuit similar to the circuit for V1 and including front contact 50 of relay V2 (now energized); and relay V3 is held up by a similar stick circuit through its front contact 60 to the stick bus 52.

On the next swing of the oscillator and closure of its contacts L1 for step period 4, relay V4 is energized over wire 56, through front contact 57 of relay V3, back contact 61 of relay V5, lower winding of relay V4, to (−). The relay V4, however, is maintained energized by a stick circuit in a different way through its front contacts 62 and 49 in series to wire 48 connected to the right oscillator contacts R1. In other words, relay V4, which is picked up through the left contacts L1 of the oscillator, is held up through the right contacts R1. Consequently, as indicated by the sequence of stepping relay operation in Figs. 7A and 7B, relay V4, which is picked up at the beginning of step period 4, is held up during period 5, and released at the beginning of period 6. In this connection, the oscillator contacts R1 and L1 are adjusted to be make-before-break, or at least operate in such rapid sequence that relay V4 does not release between the opening of the oscillator contacts L1 and closure of the contacts R1.

Upon the next swing of the oscillator for period 5, relay V5 is energized by a pick-up circuit through the oscillator contacts R1, and a front contact 49 of relay V4 (now energized). This energization of relay V5 and the opening of its back contact 54, with back contact 53 of relay V4 open at the time, removes energy from the stick bus 52, thereby releasing relays V1, V2 and V3, and conditioning the stepping bank for a repeat operation of these relays V1, V2 and V3.

Relay V5, the last one in the bank, is held up by a stick circuit through its front contact 63 and back contact 55 of relay VL until the end of the operating cycle.

During the next oscillator swing for step period 6, relay V4 is released by the opening of the oscillator contacts R1, the pick-up circuit for relay V4 through contacts L1 of the oscillator being now open at back contact 61 of relay V5.

During the next oscillator swing for stepping period 7, closure of the right contacts R1 energizes the first step relay V1 the second time, and this relay is maintained energized by its stick circuit now including back contact 53 alone of relay V4, relay V5 being now up.

In the particular arrangement illustrated, which assumes three step periods for station selection, and three for transmission of controls, a control cycle is completed upon the energization of stepping relay VI the second time, as indicated in Fig. 7A. Consequently, for this particular assumed number of steps for a control cycle, during the next oscillator swing for step period 8, upon closing left contacts L1 if the cycle selector relay is energized at that time for a control cycle, relay VL is energized at the same time as relay V2 by a circuit from (+), contacts L1, wire 56, back contact 57 of relay V3, front contact 65 of relay VI, front contact 66 of relay V5, front contact 67 of relay CS, front contact 61 of relay V5 (now up), relay VL, to (−).

This energization of relay VL and opening of its back contact 55 releases relays V1 and V5, and also restores to normal various other relays involved in the operation as latter described. Upon release of relay V5 and opening of its front contact 61, relay VL is deenergized, and after a time it assumes its normal condition to close its back contacts, whereupon the apparatus at the corresponding location is conditioned to initiate another operating cycle.

In the case of an indication cycle, as indicated in Fig. 7B, there is a repeat operation of the stepping relays V2 and V3 during the stepping periods 8 and 9 prior to the energization of relay VL during stepping period 10, by a circuit through front contact 57 of relay V3, rather than front contact 67 of relay CS. This provides two additional steps for transmission of indications.

The sequential energization of the stepping relays V1 to V5 in the manner described is used to set up the appropriate sequential channel circuits for the transmission and reception of a series of code elements.

*Pre-set transmitter relays.*—As previously indicated, it is assumed that marks and spaces, corresponding to an energized or deenergized condition of the line circuit respectively, constitute the distinctive characters of the code elements to be transmitted and received. In the system of this invention, the mark or space character of a code element for a given step period is determined by pre-set transmitter relays rendered alternately effective by the associated oscillator to control the energization of the line circuit, and conveniently designated even and odd transmitter relays EMT and OMT. Stated another way, a channel circuit established during a given step period controls the energization of transmitter relay EMT or OMT as the case may be, preparatory to the transmission and reception of a corresponding code element during the next succeeding step period.

Figure 2A:
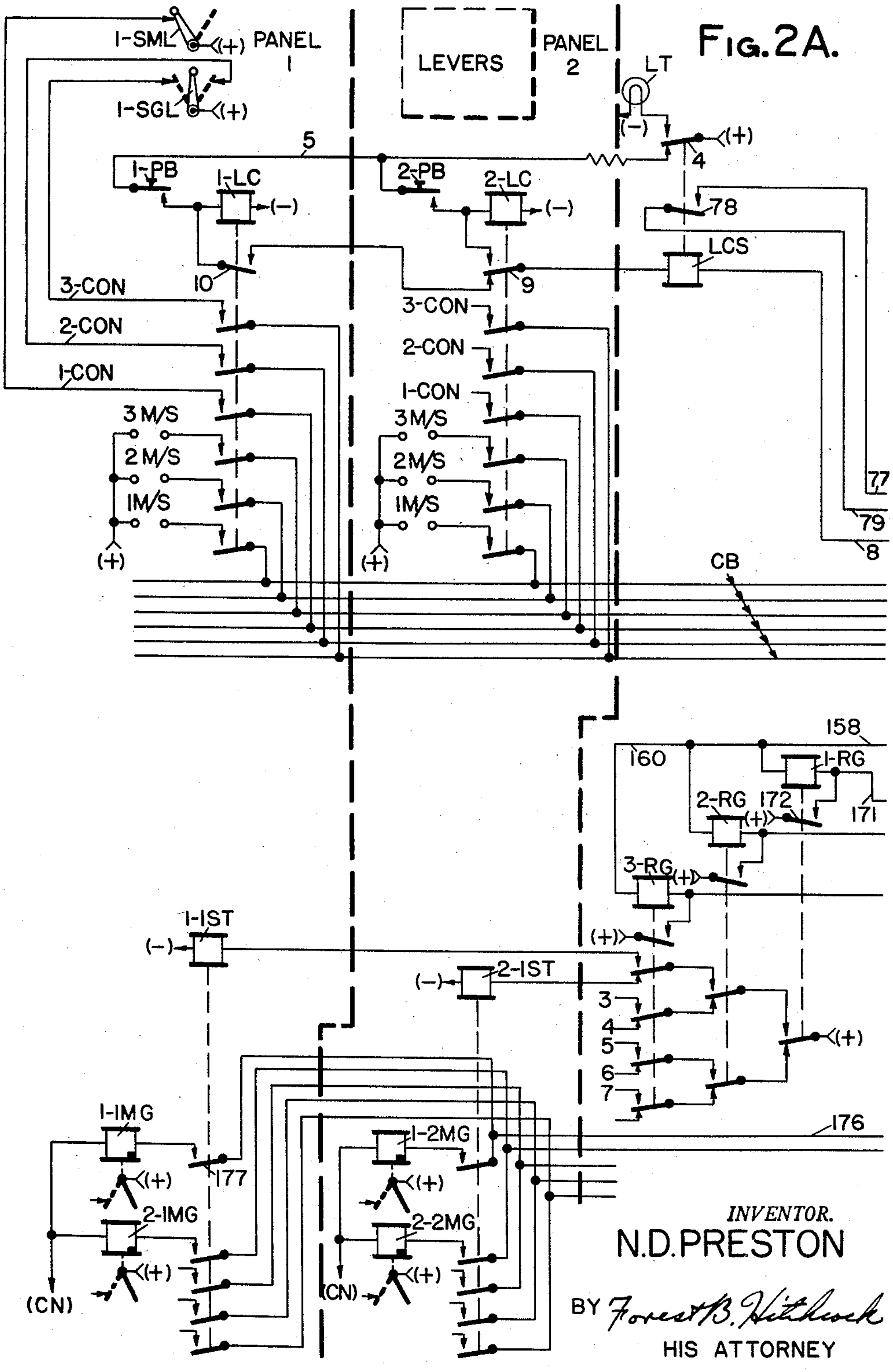
Figure 2B:
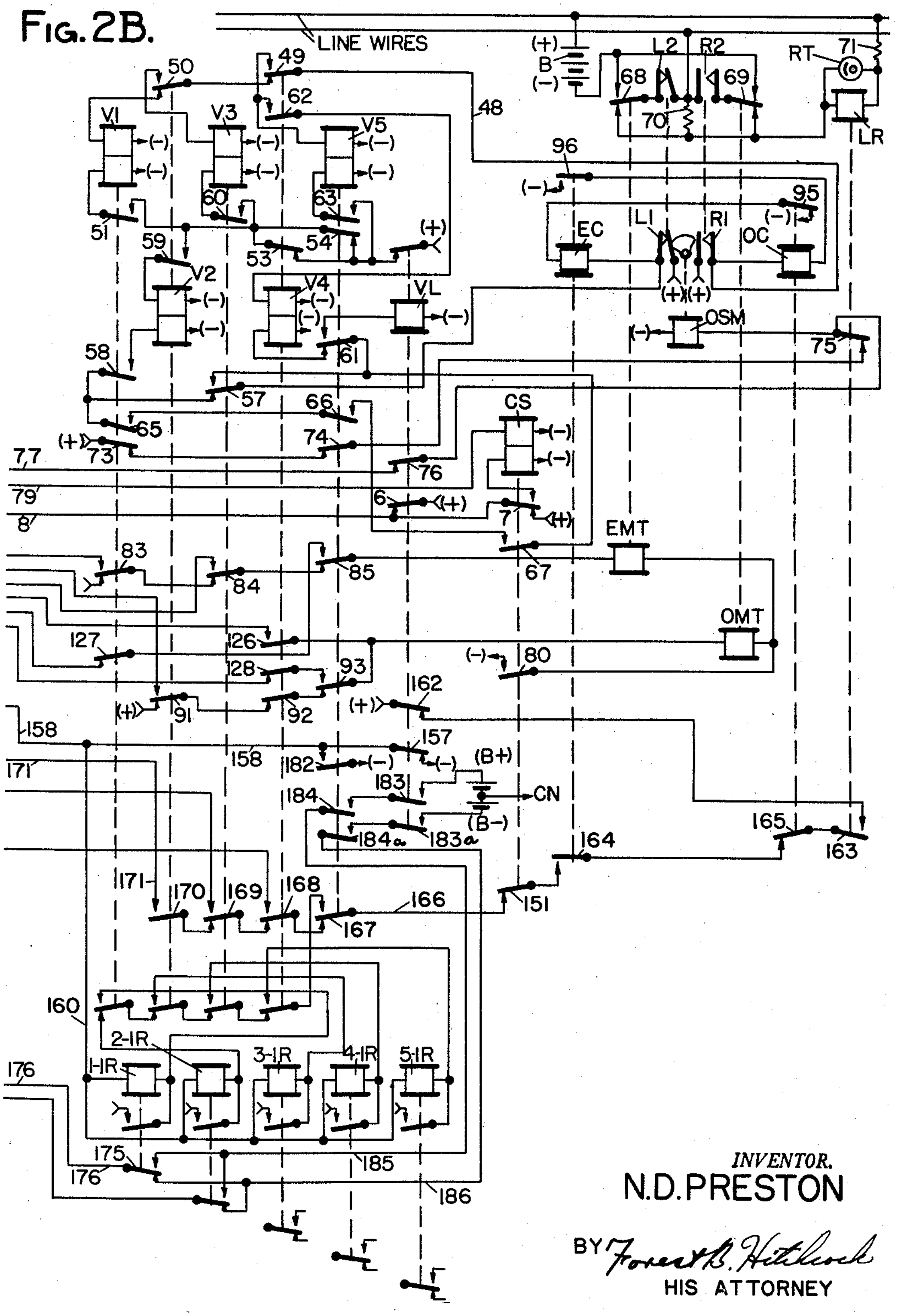
Figure 8:
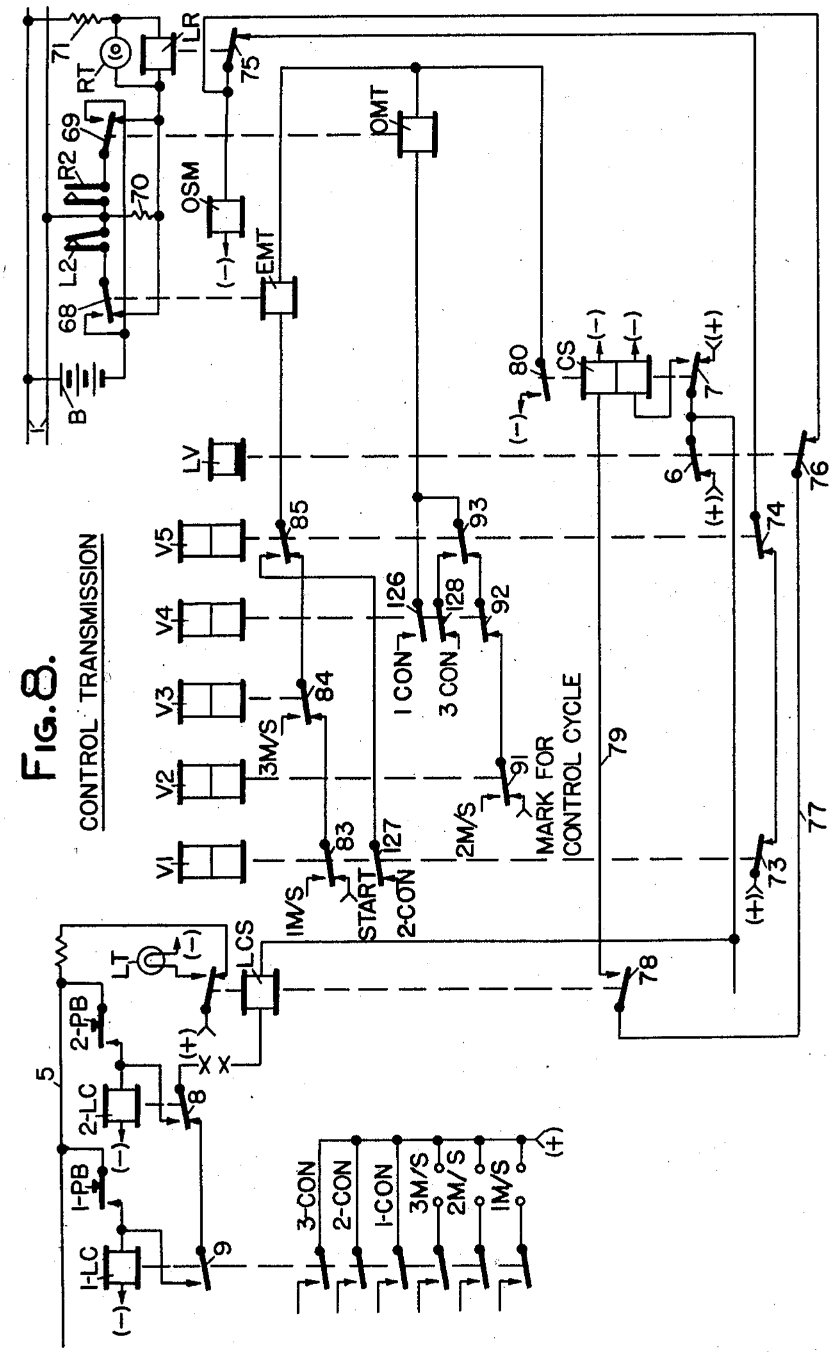
Figs. 8 and 9 illustrate separately for convenient reference the relays and circuits of the complete system more directly involved in the transmission and reception of controls.

Considering this pre-setting operation for the control office and referring to Figs. 2B and 8, the source of energy for providing marks, indicated as a battery B, is connected across the line circuit 1 over two multiple paths, each including an oscillator contact and a front contact of one of the transmitter relays EMT and OMT. With the oscillator in the normal inactive position and the left oscillator contacts L2 closed, the battery B is connected across the line circuit by circuit connections readily traced on the drawing, provided the even transmitter relay EMT is then energized to close its front contact 68. Similarly, when the right oscillator contacts R2 are closed, i.e. during the odd stepping periods 1, 3, 5, etc., the energization of the line circuit is dependent upon the closure of front contact 69 of the odd transmitter relay OMT. A similar arrangement, including like contacts 68 and 69 of the transmitter relays 1–EMT and 1–OMT, is employed at the field stations.

Thus, as indicated in the charts of Figs. 7A and 7B, the energized or deenergized condition of the line circuit to present a mark or space is dependent upon the even transmitter relay EMT during the even stepping periods, i.e. 2, 4, etc., and also the 0 period corresponding to the inactive condition of the system for starting purposes, and is dependent upon the odd transmitter relay OMT during the odd numbered stepping periods 1, 3, 5, etc.

Since the energized or deenergized condition of the transmitter relays EMT and OMT is used alternately, these relays may be controlled to become energized or deenergized, as may be necessary to provide the desired character of the next succeeding code elements, during a step period when not in use, and without effecting the condition of the line circuit as these relays are operated. The stepping periods during which these transmitter relays EMT and OMT may be pre-set for the various code elements assumed are indicated by X in the charts of Figs. 7A and 7B.

In connection with the energization of the line circuit at the different locations to initiate operation of the system and provide a mark code element, the control office should apply enough voltage to the line circuit to cause operation of the line relays at all field locations, and the various field locations should apply enough voltage to operate the line relay at the control office for reception of indications, and also the line relays at all of the other field stations to release their oscillators and lock out field starts from such station during an operating cycle. To satisfy these conditions when the line circuit has substantial linear impedance and voltage attenuation by leakage and station loads, the voltage to be applied locally at a station of the system may be materially greater than the voltage to which the associated line relay should respond. For example, the voltage applied to the line circuit at the control office should provide line relay operating voltage at the most remote field station, and this voltage may be considerably less than the voltage across the line circuit provided by such remote field location to operate the line relay in the control office. In other words, in some instances, there may be excess energization of the line relay at a location by its local source of energy.

Such excess energization of a line relay may be avoided, if desired, by the connections shown, in which the circuit connecting the line relay to the line circuit includes the oscillator contacts L2 and R2 and back contacts of the transmitter relays EMT and OMT in combination with a limiting resistor 70. The line relays such as 1–LR at the field stations have in addition an adjustable resistor R to compensate for the voltage drop in the line circuit in accordance with conventional practice. The limiting resistor 70, having a resistance selected to conform with the voltage of the local battery, is included in series with the line relay when this local battery is connected across the line circuit. For example, under the normal inactive condition of the system illustrated, the line relay such as 1–LR at each field station is connected across the line wires 1 through a back contact 68 of transmitter relay 1–EMT and left oscillator contacts L2, and is in condition to respond to the energization of the line circuit at other field stations or the control office for initiating operation of the system. If the transmitter relay 1–EMT is energized at the station under consideration, the shunt around the limiting resistor 70 (provided by the oscillator contacts L2 and back contact 68 of said relay) is broken, and the resistance of this limiting resistor 70 is thus included in series with the line relay 1–LR to avoid its over energization by its associated local battery B. The same is true for marks supplied by energization of the transmitter relay 1–EMT during even step periods, or by operation of the transmitter relay 1–OMT during the odd step periods, when the field station in question is transmitting indications.

In this way, excess energization of the various line relays by their respective local sources of energy may be avoided. The same expedient is employed at the control office.

During operation of the system in connection with field starts and transmission of indications, the line relay LR at the control office may at times be energized from a near station, and at other times from a far station; and since each of these stations should apply enough voltage to the line circuit for line relay operation at all other field stations, there is a variable energization of the control office line relay dependent upon the characteristics of the line circuit and the distances separating the field locations. Such variable energization of the control office line relay LR under such conditions may be obviated, if desired, by using a suitable voltage stabilizing unit with said line relay, such as the conventional voltage regulator tube RT and resistor 71, as shown in Fig. 2B, in addition to the limiting resistor 70.

Figure 9:
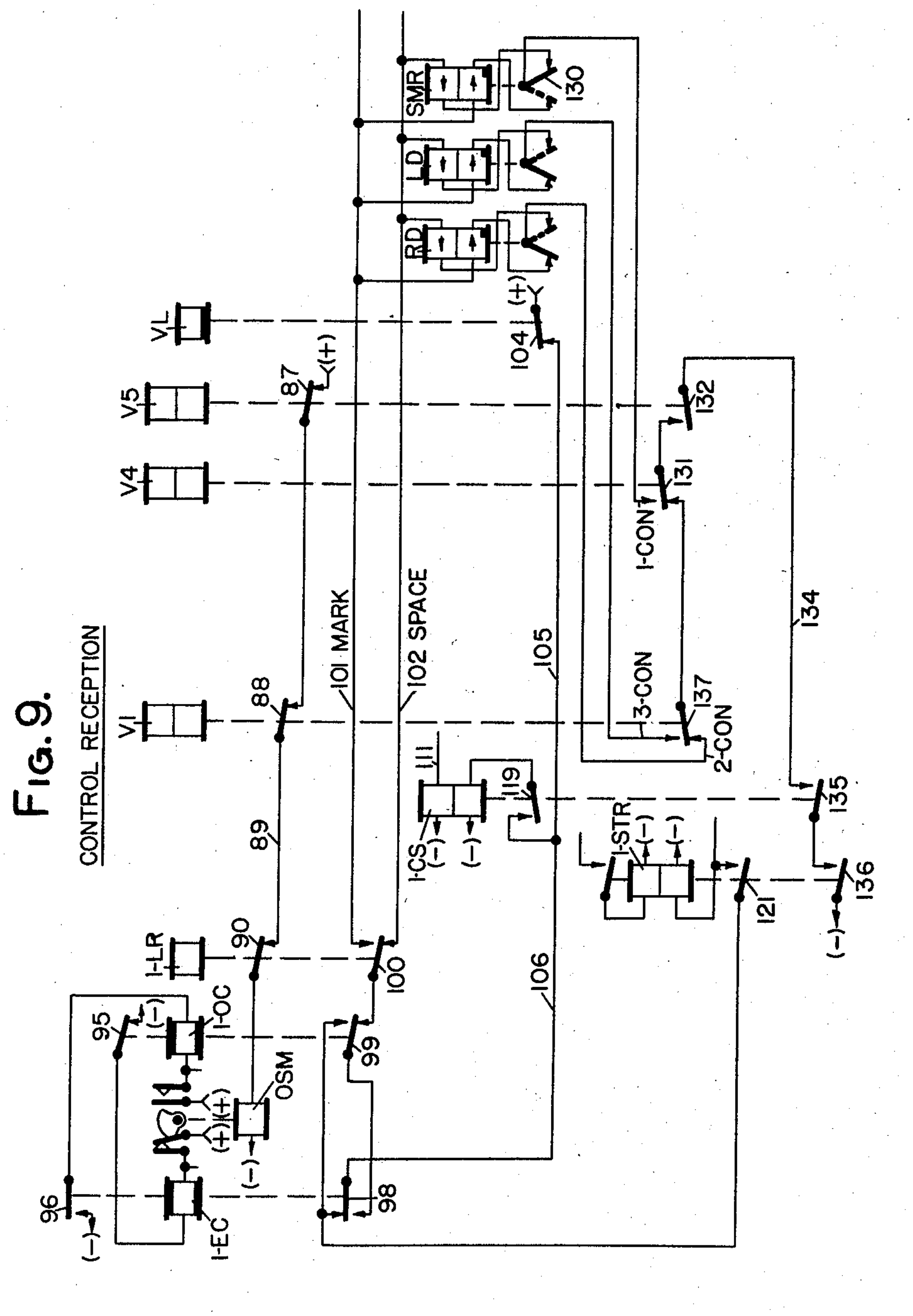
Figure 10:
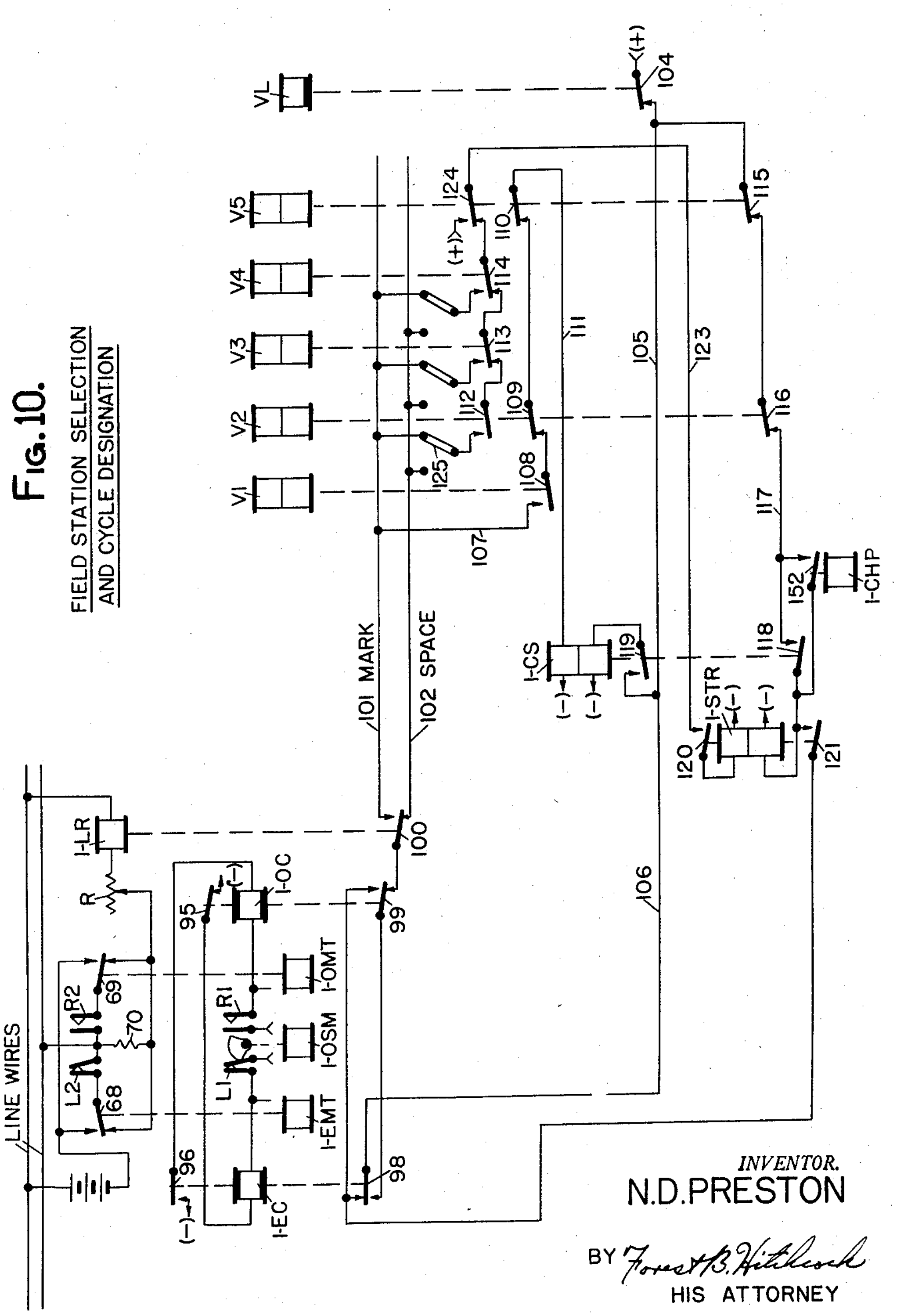
Fig. 10 shows separately relays and circuits of a typical field station relating to selection of a station and designation of an indication or control cycle.

*Operating sequence for a typical control cycle.*—The complete circuits of the system for the control office and a typical field location are illustrated in Figs. 2A, 2B, and Figs. 3A, 3B; but for convenient reference the more significant relays and circuits involved in a typical control cycle are shown separately in Fig. 8 for control transmission from the control office, in Fig. 9 for control reception at a field location, and in Fig. 10 for field station selection and cycle designation.

Figure 13:
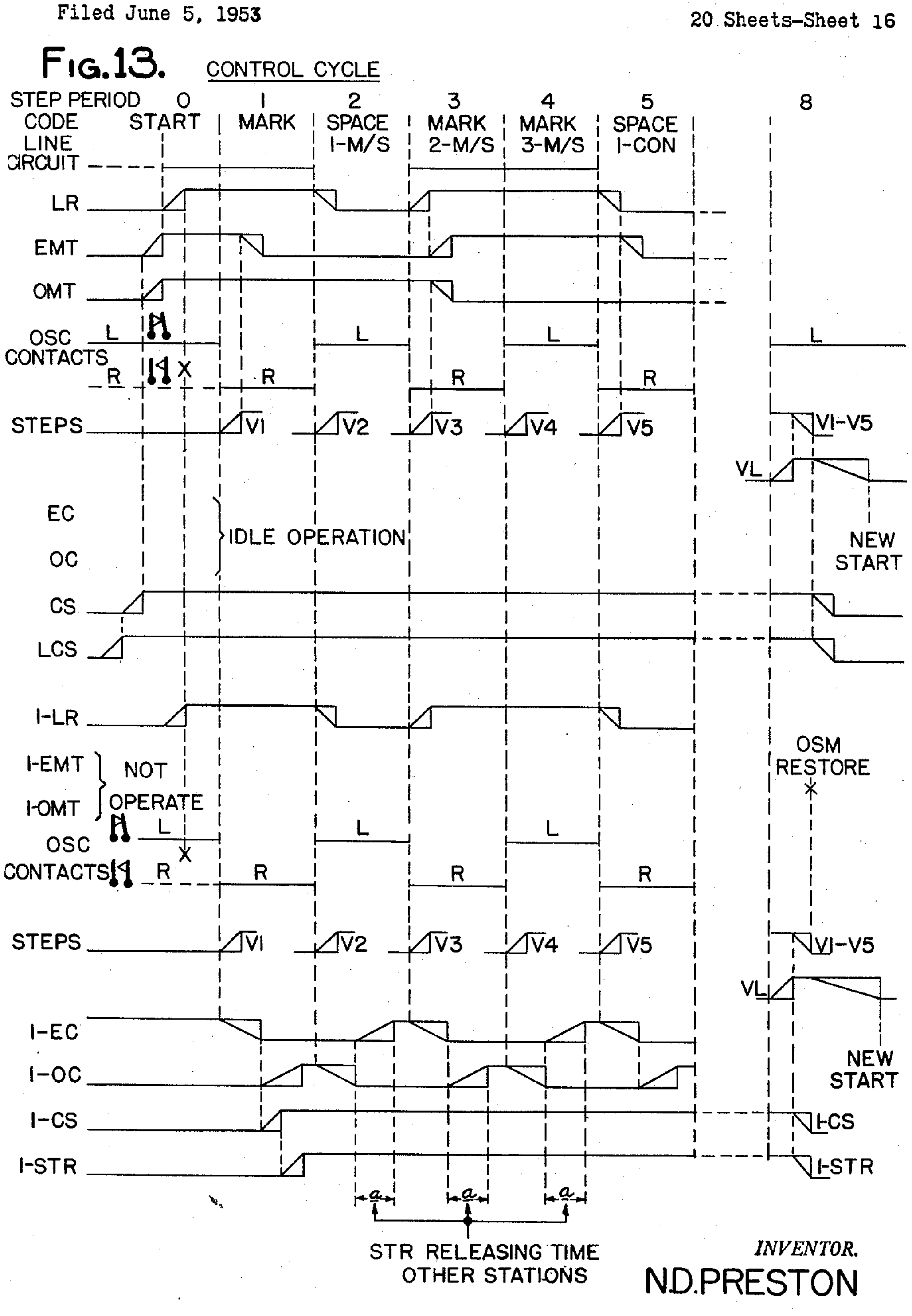
Figs. 13 and 14 are explanatory time charts illustrating the sequence of operation and timing of relays in connection with a control cycle and an indication cycle respectively.

Fig. 7A is an explanatory diagram relating to control transmission, and Fig. 13 is a time chart of relay operation for a typical control cycle.

Assuming the system in the normal inactive condition, and disregarding for the present the possible occurrence of field starts, upon actuation of a start button on a lever panel, such as 1–PB, the corresponding code setting relay 1–LC, and the master relay LCS are energized as previously explained, thereby closing a front contact 78 of relay LCS to establish a circuit for energizing the upper winding of the cycle selector relay CS, which may be traced from (+), through back contact 73 of stepping relay V1, back contact 74 of stepping relay V5, back contact 75 of line relay LR, back contact 76 of relay VL, wire 77, front contact 78 of relay LCS, wire 79, through upper winding of relay CS, to (—).

The relay CS is maintained energized until the end of the control cycle by a stick circuit which may be traced from (+), through back contact 6 of relay VL, front contact 7 of relay CS, through its lower winding, to (—).

This energization of relay CS to designate a control cycle, and closure of its front contact 80, renders the transmitter relays EMT and OMT at the control office effective to control the energization of the line circuit. When this front contact 80 of relay CS first closes, the even transmitter relay EMT is energized by a channel circuit of the stepping relay bank which may be traced from (+), (start) through the back contacts 83, 84 and 85 in series of the stepping relays V1, V3 and V5, relay EMT and front contact 80 of relay CS, to (—).

The oscillator is in its normal inactive condition at this time, with its left contacts L2 closed, so that this energization of transmitter relay EMT connects the battery B across the line circuit, thereby energizing the line relay LR at the control office, and the line relays such as 1–LR at all the field stations.

This initial start energization of the line relays while the system is at rest deenergizes the oscillator magnets OSM at all the stations. The energizing circuit for the oscillator magnet OSM in the control office may be traced from (+), through back contacts 73 and 74 in series of relays V1 and V5, back contact 75 of line relay LR, oscillator magnet OSM, to (—). The oscillator magnet such as 1–OSM at the field stations has a similar energizing circuit (see Figs. 3A and 3B) from (+), through back contacts 87 and 88 in series of the stepping relays V5 and V1, wire 89, back contact 90 of line relay 1–LR, magnet OSM, to (—).

Thus, the typical control cycle under consideration is initiated by the release of the oscillators at all of the stations of the system; and when each oscillator thus released swings past the center contact operating position, the measurement of equal time periods and the sequential operation of the relays of the stepping bank starts.

In the case of a control cycle, the first code element is made a mark. This is accomplished by pre-setting the odd transmitter relay OMT, which is energized upon closure of front contact 80 of relay CS, simultaneously with the energization of transmitter relay EMT, over a channel circuit which may be traced from (+), designated "mark," through back contacts 91, 92 and 93 in series of stepping relays V2, V4 and V5, relay OMT, and front contact 80 of relay CS, to (—).

Thus, as indicated in the time chart of Fig. 13, the transmitter relay OMT is energized at the time the oscillator contacts shift and the right contacts R2 close, and the line circuit (initially energized for release of the code oscillators) is in effect maintained energized to provide a mark during step period 1.

The next significant event in the operating sequence for a typical control cycle is the energization of a cycle selector relay such as 1–CS at all of the field stations by the mark character of the first code element transmitted during step period 1. Consideration of the detailed circuits and the reception of this cycle designating code element brings up for discussion the purpose and mode of operation of the so-called chopping relays such as 1–EC and 1-OC, which are involved in connection with the reception of all code elements. Similar chopping relays EC and OC are used at the control office for the reception of indication code elements. Also, these chopping relays at the field stations, such as relays 1–EC and 1–OC, also perform useful functions in connection with the control of the station relay such as 1–STR for selecting that particular station as the one to receive controls or transmit indications.

Referring to the chopping relays 1–EC and 1–OC at the typical field station shown, which is typical of the chopping relays of all the other locations, these relays are directly energized by closure of the oscillator contacts L1 and R1, in multiple with the stepping relays V1–V5 (see Figs. 3A, 9, 10). The energizing circuit of each of the chopping relays 1–EC and 1–OC also includes a back contact of the other, i.e. circuit for relay 1–EC includes in addition to the oscillator contacts L1, a back contact 95 of the relay 1–OC, and similarly the energizing circuit of relay 1–OC includes oscillator contacts R1 and a back contact 96 of relay 1–EC.

In general, the circuit connections provide for alternate energization of the chopping relays 1–EC and 1–OC in a predetermined time relationship to the operation of the oscillator contacts and the step intervals during which the line circuit is energized or deenergized at the sending station to form the code elements. The sequential operation of the relays 1–EC and 1–OC is indicated in the time charts of Figs. 13, 14 and 15.

During each step period there is a time interval when both of the chopping relays 1–EC and 1–OC have their back contacts closed. This time interval represents what may be termed a message or sampling period, during which the then existing condition of the associated line relay 1–LR is utilized to control code responsive means to conform with the character of the code element being transmitted. As later explained more in detail, the chopping relays 1–EC and 1–OC are designed or adjusted to have operating times to satisfy the timing requirements for existing operating conditions in a manner to assure proper reception of code elements.

In the specific arrangement of circuits illustrated, chopping relays 1–EC and 1–OC set up the message or sampling periods by applying energy through their back contacts 98 and 99 in series to a contact finger 100 of the line relay 1–LR to permit energization of a mark bus 101, or a space bus 102, in accordance with the energized or deenergized condition of said line relay at that time. The partial circuit for thus supplying energy to the contact finger 100 of line relay 1–LR may be traced from (+), back contact 104 of relay VL, wires 105 and 106 to contact finger 98 of relay 1–EC, through the back contact of this finger, back contact 99 of relay 1–OC to the contact finger 100 of line relay 1–LR.

Considering now the circuit which causes energization of the cycle selector relay such as 1–CS at each field station when a mark to designate a control cycle is transmitted during the first step period 1 (see Figs. 3A, 3B and 10), the opening of the left oscillator contacts L1 deenergizes relay 1–EC. When the back contact 98 of this relay 1–EC closes, and while the other relay 1–OC is picking up, energy is supplied over the partial circuit above traced through contact finger 100 of line relay 1–LR (now up for the mark in question) to the mark bus 101, wire 107, front contact 108 of stepping relay VI (now up), back contacts 109 and 110 in series of stepping relays V2 and V5, wire 111, upper winding of relay 1–CS, to (—).

The cycle selector relay such as 1–CS, thus energized over a channel circuit for the first step period at all field stations to designate a control cycle, is maintained energized until the end of this cycle by a stick circuit from (+), through the back contact 104 of relay VL, wire 105, front contact 119 of relay 1–CS, and its lower winding, to (—).

The next operation for a typical control cycle involves transmission of the station code for the station to receive controls, and operation of the station relays such as 1–STR, at all of the stations to bring about a selection of the particular station to receive the controls.

In the control office, as previously pointed out, the particular code setting relay such as 1–LC (energized to initiate a control cycle) selectively energizes the control buses CB for determining the mark or space character of the three code elements of the station code.

Keeping in mind the timing sequence for the pre-setting of the transmitter relays EMT and OMT, as indicated in Fig. 7A, it can be seen that the character of the first code element of the station selecting code (designated 1M/S) is determined by the position to which the transmitter relay EMT is set upon energization of stepping relay V1 during the first step period. If this code element is to be a mark, the corresponding code bus is energized, and current may flow (see Fig. 8) through front contact 83 of stepping relay V1 (now up), back contacts 84, 85 in series of stepping relays V3 and V5 through relay EMT, and front contact 80 of relay CS, to (−).

The relay EMT is thus energized (if appropriate) to give a mark for this code element; and thereafter when the oscillator contacts L2 close, the line circuit is energized. If, however, as assumed for the sequence chart of Fig. 13, the first code element of the station selecting code is to be a space, relay EMT is not energized when the oscillator contacts L2 close, and the line circuit is deenergized by the opening of oscillator contacts R2.

In a similar manner, the odd transmitting relay OMT is pre-set during the next period 2 over a similar channel circuit readily traced from the 2M/S code bus, through front contact 91 of stepping relay V2 (now up), and back contacts 92, 93 of relays V4 and V5, relay OMT, front contact 80 of relay CS, to (—). The even transmitting relay EMT is pre-set during step period 3 by another similar channel circuit through back contact 85 of relay V5 and front contact 84 of relay V3.

These pre-set conditions of the transmitter relays EMT and OMT determine the line circuit condition during the next succeeding step period, as indicated in the diagram of Fig. 7A. Thus, a group of three code elements of the appropriate mark or space character are transmitted from the control office as a station code call to designate the particular field station to receive the controls transmitted during the control cycle under consideration.

Figure 3B:
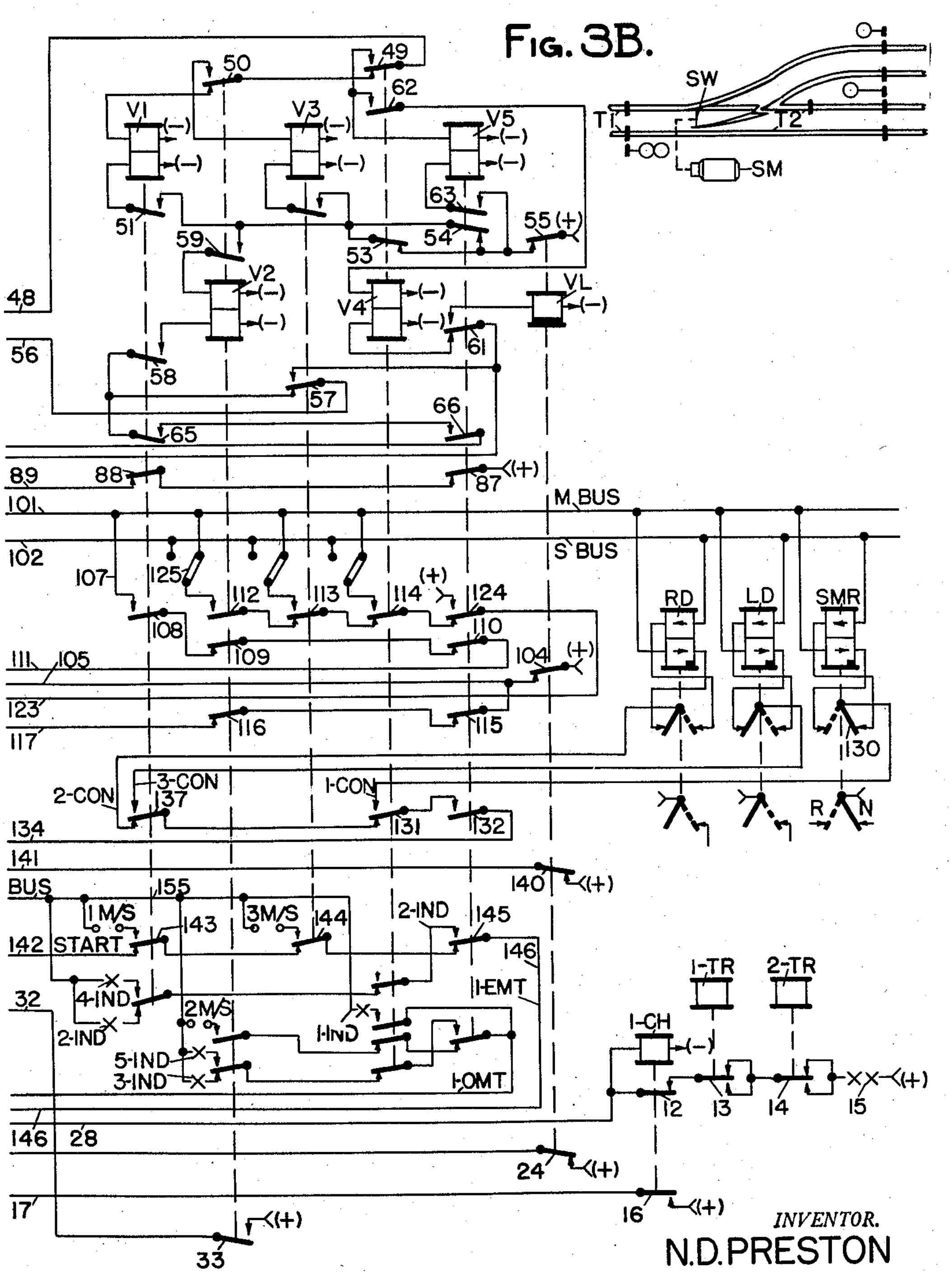

As previously indicated, a station relay such as 1–STR is used at all field stations to provide for station selection during both control and indication cycles. Generally speaking, this is accomplished by maintaining such station relay STR energized (after its initial energization at the beginning of an operating cycle) only if the character of the station selecting code elements as applied to the line circuit match the particular code call allocated to the field station. Such station code call allocation is determined by the connections made between the mark and space buses 101, 102 to front contacts 112, 113, 114 of stepping relays V2, V3 and V4 in channel circuits for a sustaining or testing stick circuit through the upper winding of relay STR. Such connections are conveniently made by the use of code jumpers 125 with terminals, as indicated in Figs. 3B and 10. The code jumpers as shown in Figs. 3B and 10 are assumed to be set to conform with a station code of three successive marks, so as to match the circuit connections illustrated in Fig. 2A for energization of a station registration relay 1–STR, assumed to correspond with the typical station illustrated. It is evident that other arrangements of code jumpers may be used to provide other station code call, such as the space, mark, mark code assumed for the showing in the time charts of Figs. 13 and 14.

Considering now the operation of the station relay 1–STR in the case of a control cycle under consideration, and referring particularly to Fig. 10, when the cycle selector relay 1–CS is energized as previously explained to designate a control cycle, the station relays STR are energized at all the field stations by a circuit from (+), back contact 104 of relay VL, back contacts 115, 116 of stepping relays V5 and V2, wire 117, front contact 118 of relay 1—CS, through lower winding of relay 1–STR, to (−). This pick-up circuit holds the relay 1–STR energized until relay V2 picks up and opens its back contact.

Each station relay such as 1–STR has two separate stick circuits through its front contacts 120, 121 and its two windings. These stick circuits, which may be termed respectively hold-over and testing stick circuits, are alternately established by operation of the chopping relays 1–EC and 1–OC in a manner to hold the relay energized during the period of change of the line relay and stepping relays between successive code elements, and yet render the energization of this relay dependent upon a match between the mark or space character of each code element and the code jumper setting for the station during the message or sampling period for each code element in turn. The same mode of operation and similar circuits are involved for each code element of the station selecting code, and it will be sufficient to explain the circuit connections and operating sequence for the first of these code elements.

Referring to the circuits of Fig. 10 and the time chart of Fig. 13, when the oscillator contacts R1 open and the oscillator contacts L1 close at the beginning of the stepping period 2 for the code element under consideration, the opening of the oscillator contacts R1 deenergizes the chopper relay 1–OC, and this relay is releasing while stepping relay V2 is being picked up and the line relay 1–LR is assuming the position for this code element. When relay V2 opens its back contact 116, the pick-up circuit for relay 1–STR is broken, but at this time this relay 1–STR is held up by its hold-over stick circuit, which may be traced from (+), through back contact 104 of relay VL, wires 105, 106, back contact 98 of relay 1–EC, front contact 99 of relay 1–OC (up at this time), through front contact 121 and lower winding of relay 1–STR, to (−).

When chopping relay 1–OC opens its front contact 99 at the appropriate interval, this hold-over stick circuit for relay 1–STR is broken, and until the other chopping relay 1–EC closes its front contact 98 to re-establish this hold-over stick circuit, the continued energization of relay 1–STR is dependent upon its testing stick circuit, which may be traced backward from (−) through the upper winding and front contact 120 of relay 1–STR, wire 123, to a contact finger 124 of the stepping relay V5 (now down), through back contacts 114, 113 of relays V4 and V3, and front contact 112 of relay V2 (now up), code jumper 125, to the mark or space buses 101, 102, as the case may be.

Assuming the code jumper for relay V2 to be in the position shown for a mark, and line relay 1–LR is energized at this time, then current may flow in this testing stick circuit for relay 1–STR. If, however, the line relay 1–LR is down at this time, indicating the space character of the code element, which does not match the mark character of the station code call allocated to this station, then the testing stick circuit for the station relay STR is not energized, and this relay drops out.

The testing stick circuit of the station relay 1–STR just described exists temporarily while the other chopping relay, i.e. 1–EC in the instance under consideration, is responding to its energization and opens its back contact 99. As soon as this contact finger of chopping relay 1–OC closes its front contact, the hold-over stick circuit is re-established. In this connection, there is a very brief interruption in the energization of the station relay 1–STR by its stick circuits during movement of the contact finger of a chopping relay 1–EC or 1–OC between front and back contacts; but it is evident that the proper kind of relay and contact adjustment may be employed, so that relay 1–STR will hold its front contact closed during such a short time, and yet release during the pick-up time of the chopping relays 1–EC or 1–OC.

The same scheme of control of the station relays STR by hold-over and testing stick circuits is repeated foı the other code elements of the station code. If the particular code element being transmitted matches the code call of a station, the relay STR of that station stays up, if not it drops. Whenever a relay STR drops out, it remains down until the end of the cycle, since its pick-up circuit is broken at the back contact 115 of stepping relay V5, before back contact 116 of relay V2 again closes.

Thus, at the end of the transmission of all of the code elements of the station code, only one relay STR remains up, and this is at the particular station being called to receive controls.

At the end of the station selecting part of the control cycle, i.e. upon energization of the stepping relay V5 in the case of the three station selection code elements assumed, the station relay such as relay 1–STR at the surviving station is held up for the rest of the operating cycle by a permanent stick circuit from (+), through front contact 124 of relay V5, wire 123, and front contact 120 and upper winding of relay 1–STR, to (—).

Considering now the transmission of controls following the station selecting portion of the control cycle, the particular code setting relay such as 1–LC in the control office then energized connects the respective control buses CB individually to the contacts of control levers on the corresponding lever panel, thereby causing selective energization of these buses as and when the position of the control levers so requires, to conform with the mark control code elements to be transmitted. The transmitter relays EMT and OMT are pre-set in the same way as previously explained to establish a mark or space character of the respective control code elements.

Considering the detailed circuits for the first control code element 1–CON, to be transmitted and received during step period 5 (see Fig. 7A), the odd transmitter relay OMT is pre-set during the step period 4 when stepping relay V4 picks up, by a circuit, through front contact 126 of relay V4 through relay OMT and front contact 80 of relay CS, to (—). This particular channel circuit does not include a contact of stepping relay V5, since this relay V5 picks up during the step period 5 at a time when relay OMT, if up, should stay up to maintain a mark throughout step period 5. Since relay V4 drops at the end of period 5, and does not operate during the repeat operation of the stepping relays (see Figs. 7A and 7B), the channel circuit in connection through front contact 26 alone of relay V4 is established and broken at the proper intervals.

The channel circuit for pre-setting transmitter relay EMT for control code element 2–CON includes a front contact 85 of stepping relay V5 and a back contact 127 of stepping relay V1, this channel circuit being established during step period 5 when relay V1 releases after the pick up of relay V5, and being maintained through step period 6 until relay V1 picks up during step period 7.

The channel circuit for pre-setting transmitter relay OMT for control code element 3–CON includes a front contact 93 of stepping relay V5 and a back contact 128 of stepping relay V4, and is established when relay V4 drops in the step period 6, and is maintained until relay V5 is released during step period 8 at the end of the cycle by energization of relay VL (see Fig. 7A).

In this way, the transmitter relays EMT and OMT are preset for the transmssion of marks or spaces for the three control code elements 1–CON, 2–CON and 3–CON, to conform with the control codes to be transmitted; and as the oscillator closes its contacts L2 and R2, these control codes are applied to the line circuit during the appropriate step periods for transmission to the particular field station selected.

Considering now the reception of the control code elements at the field station thus selected, and assuming that the typical field station illustrated is the one to receive such controls, it is contemplated that these controls will be registered upon relays SMR, LD and RD of the mag-stick type, which operate their contact fingers to opposite positions in response to the energization of one or the other of their two windings, said contact fingers being magnetically retained in the set position until shifted by a different control code. A mag-stick relay of the type contemplated is disclosed, for example, in the patent of Willing et al., No. 2,535,977, issued December 26, 1950. This is merely representative of one type of control code responsive means, and any suitable arrangement of code responsive relays may be used for this purpose.

In the arrangement illustrated (see Figs. 3B and 9), two windings of these control relays SMR, LD and RD are connected respectively to the mark and space buses 101 and 102 through contacts of a contact finger such as 130 of the relay itself. These contact fingers such as 130 serve to maintain the mark and space buses 101 and 102 electrically isolated, and eliminate circuit paths between these buses through the windings of the relays SMR, etc. that might otherwise interfere with the desired operation of these relays, or the station selecting relay 1–STR.

The contact fingers such as 130 of these relays SMR, etc. are connected to (—) over channel circuits sequentially set up by the stepping relays V5, V4 and V1. These channel circuits include front contacts of the station relay 1–STR and the cycle selector relay 1–CS, so that these control relays SMR, etc. are energized only at the selected station having its station relay 1–STR energized, and during a control cycle when a cycle selector relay such as 1–CS is energized.

Considering in detail the circuits for operating the control relay SMR in response to the mark or space character of the first control code element 1–CON, during the stepping period 5 during which this code element is transmitted and received (see Fig. 7A), stepping relay V5 picks up while relay V4 is held up. Under these conditions, the contact finger 130 of relay SMR is connected to (—) through front contacts 131 and 132 of relays V4 and V5, wire 134, front contact 135 of relay 1–CS, and front contact 136 of relay 1–STR (see Figs. 3B and 9). Assuming relay SMR to be in the mark position as shown, energization of the space bus 102 causes current to flow through the upper winding of relay SMR, and its contact finger 130, moving this finger in the direction indicated by the arrow to the left or space position. If relay SMR is in the mark position shown, and a mark is transmitted to energize the mark bus 101, there is no occasion to operate this relay, and the circuit through its lower winding for so doing is open at its contact finger 130.

Similar circuits control the operation of the other control relays RD and LD. When the stepping relay V4 drops during the step period 6 (see Fig. 7A), the channel circuit for relay RD is established through back contact 131 of relay V4 and back contact 137 of relay V1, now down. On the next step period relay V1 picks up and establishes through its front contact 137 the channel for relay LD.

Although the mark and space buses 101, 102 to which the control code responsive relays SMR, etc., are connected, are energized at all stations, these relays are operated only at the selected station having its relay 1–STR up and its front contact 136 closed. Similarly, these mark and space buses are energized during an indication cycle; but in this case station relay 1–CS is deenergized and its front contact 135 is open, so that the relays SMR, LD and RD are not operated.

At the end of the control cycle under consideration, the relay VL at each field station is energized during step period 8 (see Fig. 7A) due to a circuit previously explained, through front contact 67 of the cycle selector relay 1–CS. The energization of this relay VL and opening of its back contacts 55 and 104 brings about release of stepping relays V1, V5 then up, and the cycle selector relays such as 1–CS, and the station relay 1–STR (if up). In other words, the apparatus at all the field stations is restored to normal and inactive conditions.

Similarly, the energization of the relay VL at the control office releases the code setting relay, such as 1–LC that may then be up, and master relay LCS, as well as the cycle selecting relay CS, thereby restoring the control office apparatus to its normal condition.

In the case of the oscillators, the oscillator magnet OSM is energized during period 8 in question, while the oscillator armature is swinging toward the left, when stepping relays V1 and V5 release and close their back contacts, i.e. back contacts 73, 74 at the control office, and 87, 88 at the field stations. Thus, the oscillators lock up, ready for the next operating cycle.

Considering the starting circuits previously discussed, it is noted that these include a back contact 76 of relay VL in the control office, and back contact 104 of relay VL at the field stations, so that the start for the next succeeding operating cycle is delayed until relays VL at the locations have released. These relays VL are preferably made somewhat slow releasing to provide a time margin for full restoration of the apparatus at all locations to the normal inactive conditions, before another operating cycle can be initiated.

From the foregoing explanation of a typical control cycle, together with the time charts and sequence diagrams, it can be understood how the system of this invention will enable an operator in a central control office to control the switches and signals (or equivalent remote control devices) at a plurality of field locations, from time to time as he desires. Such communication is established on a time sharing basis one field location at a time, but the operating cycles are short in a system of this type (in the order of two seconds), so that new controls can be communicated as rapidly as the occasion arises.

*Operating sequence for a typical indication cycle.*—Indications are transmitted to the control office from the several field stations one station at a time in much the same way as controls are transmitted; but in the case of indications, there is no operator to predetermine the particular field station with which communication shall be established. The conditions calling for transmission of new indications from the field station arise in practice indiscriminately, and in a random fashion; and under some conditions two or more field stations are ready at the same time to send indications.

Under ordinary operating conditions, there are many instances when only one field station has new indications to transmit at a given time, and it is convenient to describe the circuits and operating sequence for indication transmission under such circumstances, before considering the operation of selecting and registering the field stations on the code superiority basis under the more unusual circumstances where a plurality of field stations are ready to send indications at the same time.

Figure 11:
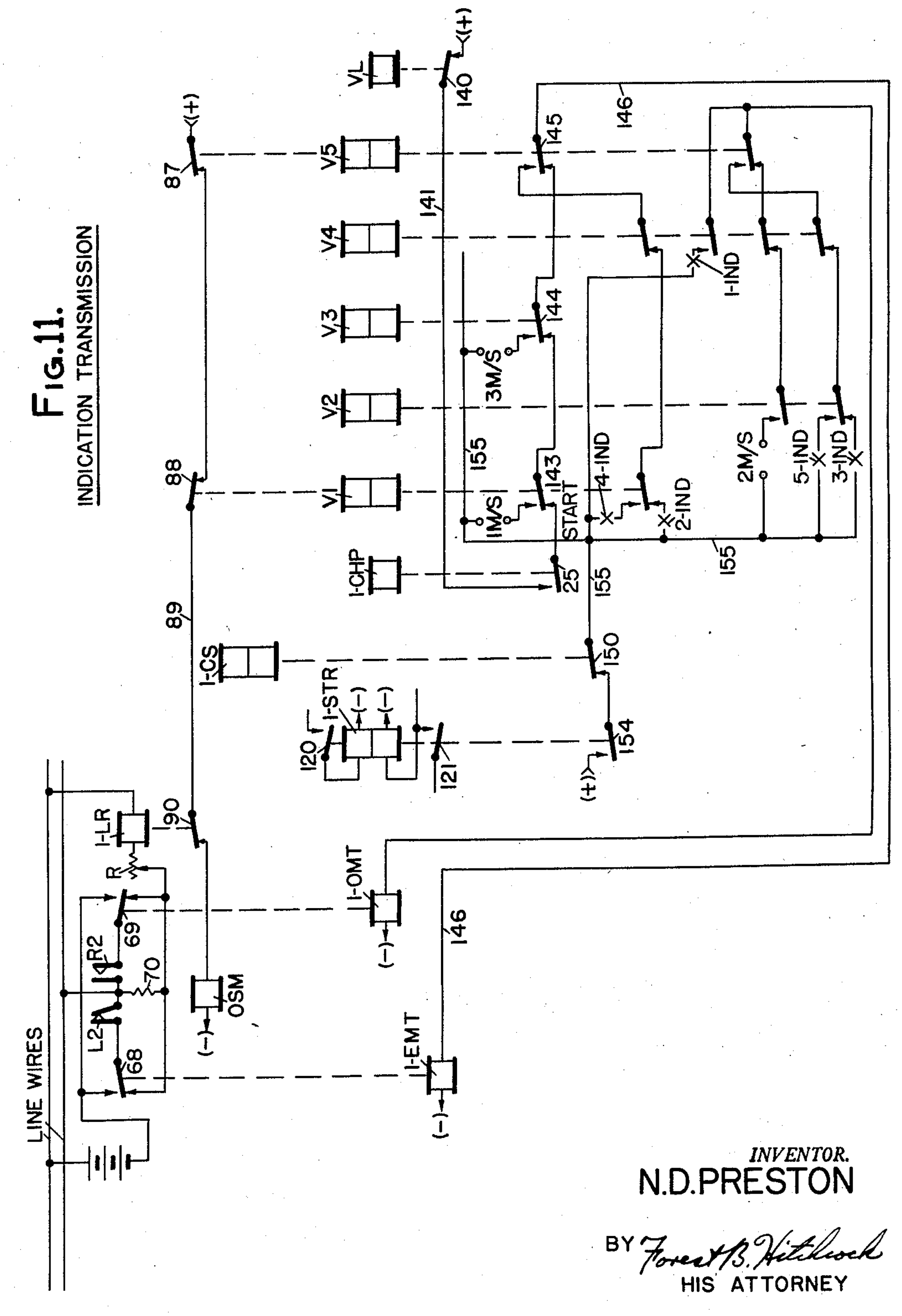
Figs. 11 and 12 illustrate separately for convenient reference the relays and circuits of the complete system more directly involved in the transmission and reception of indications.
Figure 12:
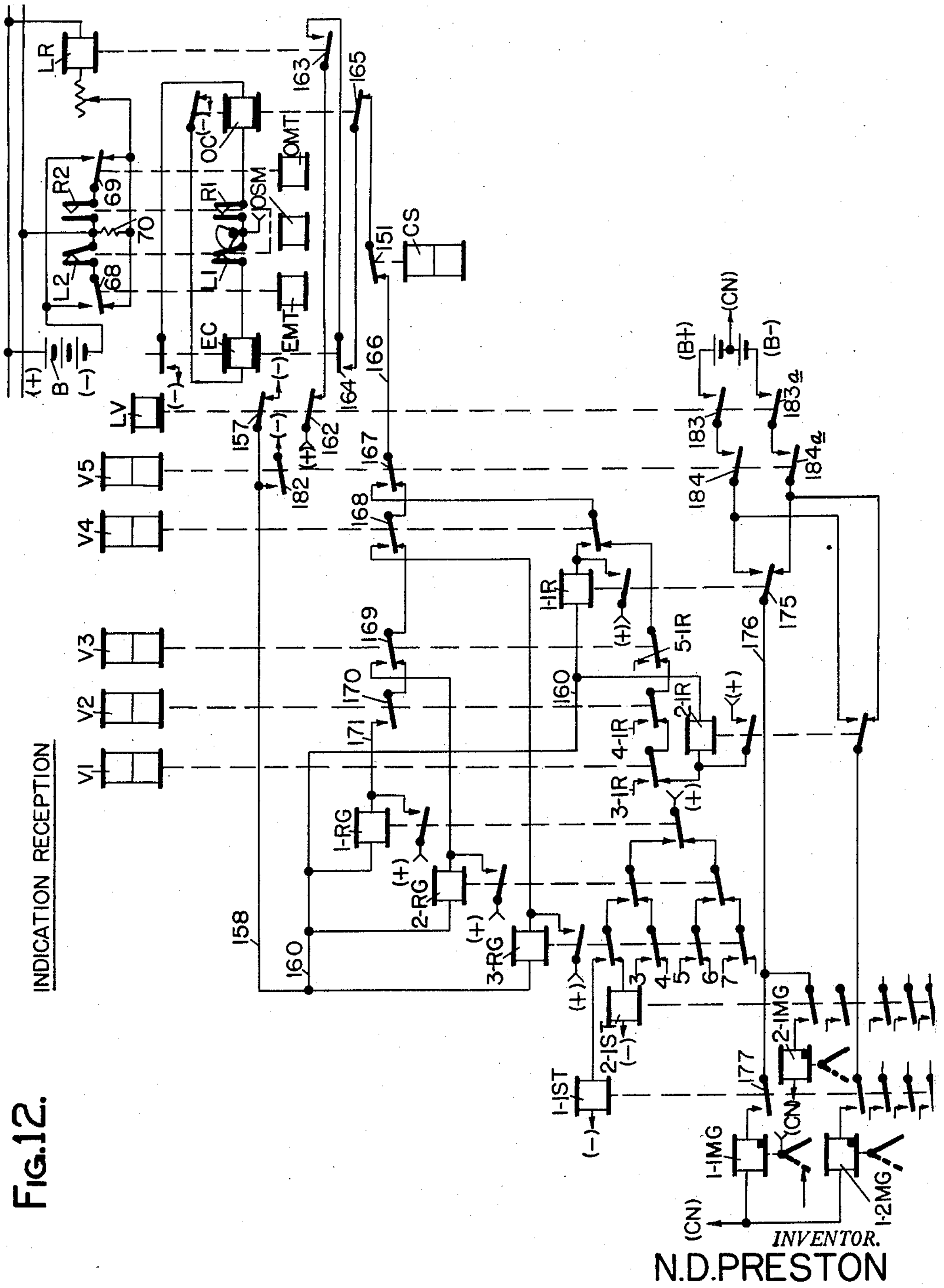
Figure 14:
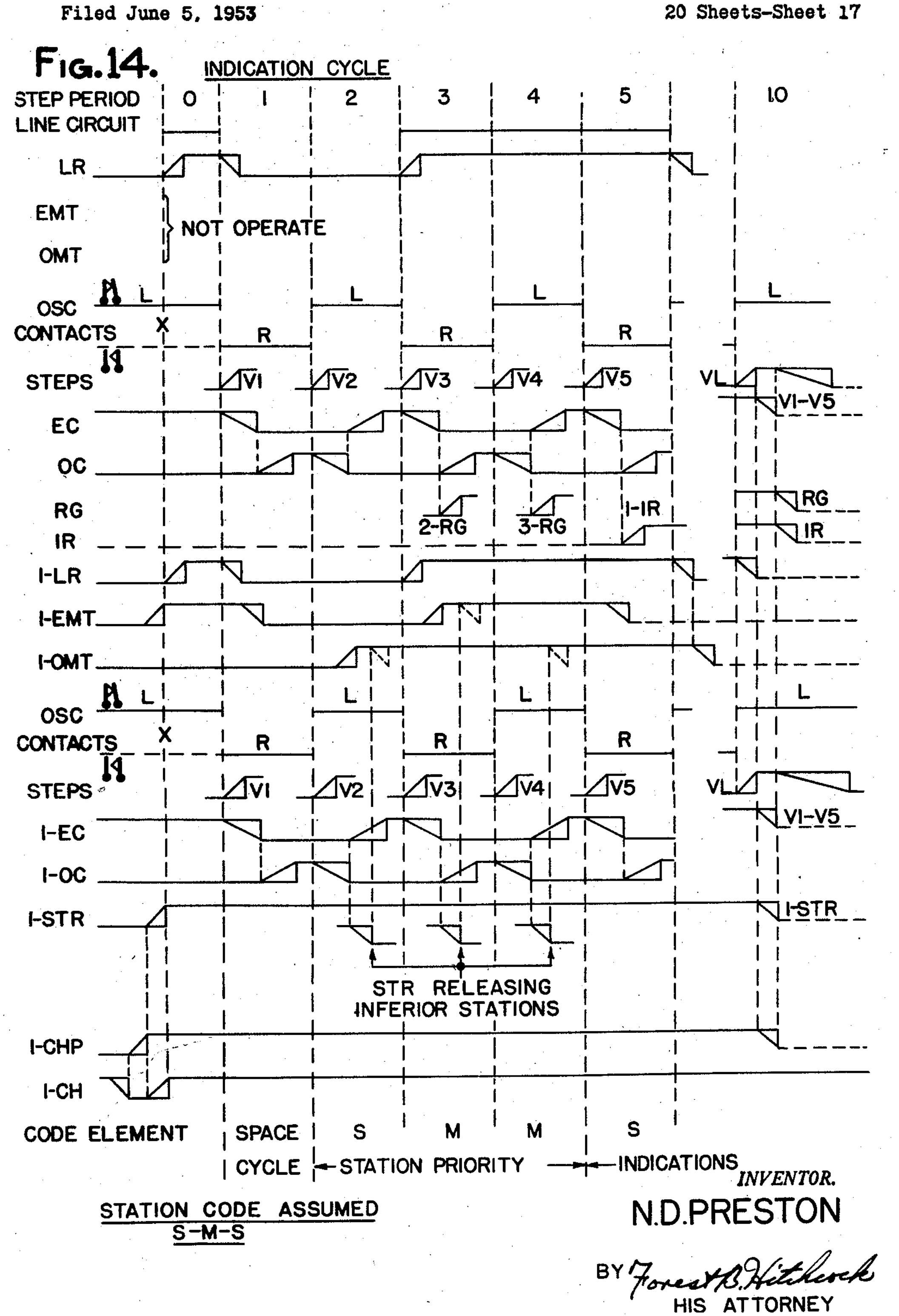

For convenient reference, the relays and circuits more directly involved in the transmission and reception of indications are segregated in Figs. 10, 11 and 12. Fig. 7B is a diagram of the operating sequence of the stepping relays and their time relationship to other functions. Fig. 14 is a time chart of the sequence of relay operations for a typical indication cycle.

Each field station operates in the same way during an indication cycle, and it is convenient to assume that the typical field station illustrated is the one operating. The circuits for energization of the change repeater relay 1–CHP for an automatic field start has been previously explained.

The energization of the relay 1–CHP, and closure of its front contact 25 establishes an energizing circuit for transmitting relay 1–EMT to cause energization of the line circuit, and bring about release of the oscillators at all locations. Referring to Fig. 11, this starting circuit for energization of transmitter relay 1–EMT may be traced from (+), through back contact 140 of relay VL, wire 141, front contact 25 of relay 1–CHP, wire 142, back contacts 143, 144, 145 in series of stepping relays V1, V3 and V5, wire 146, relay 1–EMT, to (−).

In the case of an indication cycle, the transmitter relay 1–OMT at the field station is not energized, and the first code element is a space. Accordingly, the cycle selector relays at all field stations, such as relay 1–CS, remain deenergized. In the case of an indication cycle under consideration, the cycle selector relay CS in the control office was not previously energized by the operator, and as soon as the line relay LR in the control office is energized to open its back contact 75, the energizing circuit for relay CS (previously described) is broken, and remains open throughout the indication cycle. Thus, the cycle selector relay CS at the control office is down during an indication cycle.

It may be pointed out here that, in the particular arrangement illustrated, a code setting relay such as 1–LC and the master relay LCS may be energized by push button actuation while an indication cycle is in progress. This enables the operator to condition the system for transmission of controls any time it is expedient, and such control transmission will immediately follow any indication cycle that happens to be occurring at the time, the desired preference for control cycles being obtained, if desired, by making the relay VL in the control office have a shorter release time than the relays VL at the field stations.

With the cycle selector relays CS deenergized at all locations, the system is conditioned for transmission of indications. The transmitter relays EMT and OMT at the control office do not operate, because front contact 80 of relay CS is open. The control responsive relays SMR, LD, etc., are not operated at the field stations, because front contact 135 of its cycle selector relay such as 1–CS is open. The transmitter relays 1–EMT and 1–OMT at the field station transmitting may be operated by circuits presently explained including a back contact 150 of cycle selector relay 1–CS; and similarly circuits presently described for reception of indication codes in the control office are effective on account of closure of a back contact 151 of cycle selector relay CS.

The energization of relay 1–CHP in connection with the field start closes a front contact 152 to cause initial energization of the station relay 1–STR over a circuit similar to the one previously traced through its lower winding for a control cycle. In the case assumed, where only one field station is ready to transmit indications, the station relays such as 1–STR do not pick up at the other stations, their relays such as 1–CHP being down.

The energization of relay 1–STR at the transmitting field station supplies (+) through its front contact 154 and back contact 150 of relay 1–CS to an indication (+) bus 155, which connects to code jumpers and the contactors of the devices to be indicated, and permits conditioning of the transmitter relays 1–EMT and 1–OMT at the station in question for transmission of a station code, and indication code elements in accordance with the existing position or condition of the devices being indicated. The transmitter relays 1–EMT and 1–OMT are pre-set to provide these code elements in the same manner previously discussed in connection with a control cycle (see Fig. 7B). For example, the channel circuit for pre-setting transmitter relay 1–EMT for the first code element (designated 1–M/S) of the station code may be traced in Fig. 11 from the (+) indication bus 155 through a code jumper, front contact 143 of relay V1, back contacts 144, 145 of relays V3 and V5, wire 146, relay 1–EMT, to (−).

These code jumpers 1–M/S, 2–M/S and 3–M/S in the channel circuits for pre-setting transmitter relays 1–EMT and 1–OMT are arranged in accordance with the particular call allocated at the field station. Consequently, the line relay 1–LR at this field station is operated to conform with this station code, and station relay 1–STR is maintained energized at this station by the same hold-over, testing and permanent stick circuits previously described in connection with transmission of controls to this particular station. Consequently, when the step periods for transmission of indications are reached, the station relay 1–STR in question is still energized, and (+) is applied through its front contact 154, to the indication bus 155, so that the indication channel circuits designated 1–IND, 2–IND are effective to pre-set the transmitter relays 1–EMT and 1–OMT, and bring about transmission of indication code elements of a mark or space character to conform with the existing status of the devices to be indicated. For convenience, the contactors of the devices to be indicated, which are included in these channel circuits, are designated by a cross (X), it being understood that a closed contactor and an energized channel circuit represents a mark, whereas an open contactor represents a space. These channel circuits are similar to those for providing controls 1–CON, 2–CON, etc. previously explained for control transmission, and need not be described in detail.

Considering now the reception of indications in the control office, in the arrangement illustrated it is proposed to register the mark character of the successive code elements by energization of suitable normally deenergized station register relays 1–RG, 2–RG and 3–RG, for the three code elements of the station code call, and a number of indication register relays 1–IR, 2–IR, etc. for the indication code elements.

The station register relays 1–RG, 2–RG, etc. constitute a station registration bank, and set up circuit paths through their contacts to correspond with the station codes. Indication station relays, such as 1–IST, 2–IST, one for each lever panel, are selectively energized by these circuits of the station registration bank to select the indication storage mag-stick relays, such as 1–IMG, relating to the particular lever panel corresponding to the station code of the field station transmitting. With a given indication station relay such as 1–IST energized, the indication code elements, which are received and registered on the indication storage relays 1–IR, etc., are transferred to the indication mag-stick relays 1–IMG, etc. during an execution period at the end of the cycle.

The operating circuits are similar for the different relays of these functional groups, and it will be sufficient to explain typical circuit connections that are duplicated to obtain the desired over-all result.

In the case of an indication cycle under consideration, the cycle selector relay CS is deenergized, and (—) is connected through back contact 157 of relay VL, wire 158 to an indication register bus 160, to which one terminal of the winding of each of the register relays 1–RG, etc., and indication register relays 1–IR, etc. are connected. The other terminals of these relays are connected to channel circuits through contacts of the sequentially operated stepping relays. Assuming a mark for the first code element of the station code transmitted during step period 2, when the sampling or message period is established while both chopping relays EC and OC are closing their back contacts, a circuit for energization of register relay 1–RG is established from (+), back contact 162 of relay VL, front contact 163 of line relay LR (energized for the mark assumed), back contacts 164, 165 in series of relays EC and OC, back contact 151 of relay CS, wire 166, back contacts 167, 168, 169 in series of relays V5, V4 and V3, front contact 170 of relay V2, wire 171, relay 1RG to the (—) registration bus 158.

This energization of relay 1RG closes its front contact 172 to establish a stick circuit maintaining it energized until the end of a cycle.

If the first code element of the station code of the field station transmitting indications should happen to be a space, the line relay LR is not energized at the time, and register relay 1–RG is not energized, thereby manifesting the transmission of a space. Similar circuits are provided for energizing and holding up the other register relays 2–RG, 3–RG, and the various indication register relays 1–IR, 2–IR, etc.

Referring to Figs. 2A and 12, mag-stick relays such as 1–IMG are preferably used to control the lighting of lamps or the like for the display of indications on the lever panels of the control machine, since this type of relay magnetically holds its armature in the last operated position without requiring operating current, and there is no loss of the standing indications in the event of a power failure. A mag-stick relay with a single winding may be controlled to operate its contacts to the desired position by different polarities of the energizing current through its winding. The indication register relays such as 1–IR, 2–IR, etc. are arranged to supply through front and back contacts such as 175 (B+) or (B—) of a split battery or the like to a bus 176 for the corresponding indication. When the indication station relay such as 1–IST for a given lever panel is energized, this bus 176, and the buses for the other indications, are connected through front contacts such as 177 of this relay to the corresponding mag-stick relays such as 1–IMG belonging to the corresponding lever panel.

One terminal of the winding of all of these mag-stick relays (left as shown) are connected to the mid-tap of the split battery, or equivalent source of different D.C. polarities, as indicated by the symbol (CN). When the last stepping relay VL picks up at the end of a cycle, the terminals of this split battery are connected through front contacts 183 and **183*a* of this relay VL and front contacts 184 and 184*a* of relay V5, to (B+) and (B—), buses 185 and 186 (see Fig. 12). Current may now flow through the windings of all of the mag-stick relays, such as 1–IMG, belonging to the particular lever panel selected by a station relay, such as 1–IST, in a direction dictated by the existing set position of the contacts, such as 175**, of the indication register relays 1–IR, etc., thereby positioning these indication mag-stick relays to conform with the mark or space character of the indication code element just received.

This execution period for the indication mag-stick relays begins with the energization of relay VL and the closure of its front contacts 183, **183*a* while relay V5 is still energized, and ends with the release of relay V5 and opening of its front contacts 184, 184*a***. In other words, the indication mag-stick relays are executed during the release time of relay V5.

In order that there may be no change in the set position of the contacts of the indication register relays 1–IR, etc. during this execution period, their stick circuits include a front contact 182 of relay V5 in multiple with the back contact 157 of relay VL. Consequently, the relays 1–IR, etc. that may be energized are not released until relay V5 releases and opens its front contact 182 at the same time the execution circuits are broken through its front contacts 184, **184*a***.

In this way, the indication codes as transmitted from the selected field station are first registered step by step on relays 1–IR, 2–IR, etc., and then at the end of the cycle these indications are transferred or executed to the indication mag-stick relays belonging to the lever panel of this particular field station. This arrangement is merely typical or representative, and various other circuit organizations may be employed to bring about the desired display of indications on the control board in response to the transmission of indications from a selected field station.

*Station priority for indication transmission.*—In the foregoing discussion, it was assumed that only one field station was involved in the transmission of indications. In practice the changes in the existing condition of devices at the field locations to be indicated, more particularly in the case of track circuits, occur in random fashion, even while the system is being used for the transmission of controls or indications from other stations, and it frequently happens that the change repeater relays such as 1–CHP are energized at two or more field stations at the time the system is in, or assumes, its inactive condition. Under such conditions, each of these stations initiates a field start, and tries to transmit its indications to the control office. This contingency calls for the provision of suitable means for exercising some preference or priority between such field stations, so that they will act to transmit their indications one station at a time.

Assuming such a situation, where some indefinite plurality of field stations are ready to transmit indications, the oscillators are started at all the locations in the regular way by the initial energization of the line circuit for a field start. Also, the station relay STR picks up at each of the field stations in question. The first code element is a space, and the cycle selector relays such as 1–CS remain down at all of the stations. Each of these field stations under consideration starts out to operate in the same manner previously explained to condition the line circuit to conform with the character of the code elements of its station code. If the first of such code elements is a mark for any one of the stations in question, the resultant energization of the line circuit operates the line relay such as 1–LR at that station, and also the line relays at all other stations. If such mark character matches the code call of the station, its station relay STR is held up; but if a station has a station code call having a space for this code element, its station relay STR drops out. Whenever the station relay STR releases at a station, its front contact 154 deenergizes the indication (+) bus 155, and the transmitter relays such as 1–EMT and 1–OMT are no longer energized at this particular station, even though a code jumper connection for a subsequent step period may call for such operation.

Thus, a mark may be considered to be a superior code element, which acts whenever it occurs to release the station relay STR at each station or stations requiring a space for the corresponding code element of the station codes allocated to such station or stations. It can be seen that, as the plurality of stations in question with new indications to transmit impress upon the line circuit the character of the code elements of their respective station codes, station relays STR are released to leave the station relay STR energized at only one of such stations having a superior station code. Assuming for simplicity that M represents a mark and S a space, the following table indicates in order the relative superiority of the station codes for three code elements:

| | | | |
|---|---|---|---|
| 1 | M | M | M |
| 2 | M | M | S |
| 3 | M | S | M |
| 4 | M | S | S |
| 5 | S | M | M |
| 6 | S | M | S |
| 7 | S | S | M |

The station code of three spaces is ordinarily not used, since this represents no distinction over the normal deenergized condition of relays, and might falsely exist in the event of circuit failures.

As previously indicated, the change repeater relay such as 1–CHP is not released at a field station until this station actually transmits indications. Hence, inferior stations that may be rejected during a given indication cycle, are in condition to provide an automatic field start and transmit indications on the next operating cycle, subject to the operation of the cycle distribution relay 1–CD, as previously discussed.

As previous explained, the field station selecting codes applied to the line circuit and the resultant operation of the line relay LR in the control office operates the station register relays 1–RG, 2–RG and 3–RG of the station registration bank to pick up a particular station relay such as 1–IST corresponding to this station code. This causes the indications transmitted from the particular field station in question to be delivered to the corresponding lever panel. In the case under consideration, where a plurality of field stations initially started to send indications at the same time, it can be seen that the particular station code thus registered in the control office is the superior code allocated to the surviving station. The energization of the line circuit for a mark during a given step period acts to retire an inferior station or stations; and hence the mark registered in the control office is a code element of the station code of the surviving station. In other words, during the operation of establishing a preference or priority as between field stations having new indications to transmit on the basis of the superiority of their station codes, the particular station code for the station ultimately surviving is at the same time automatically registered upon the station registration bank in the control office, so that the indications transmitted from such surviving station are delivered to the proper lever panel.

*Simultaneous field and control office starts.*—Since the manual manipulation of push buttons by the operator at the control office, and the energization of relays such as 1–CHP for field starts at the various field stations may occur any time in a random fashion, control office and field starts may occasionally occur simultaneously. In this system, if the master relay LCS in the control office in response to manual manipulation of start buttons is able to energize the cycle selector relay CS, and establish its stick circuit, before the back contact 75 of the line relay LR is opened by a field start, the ensuing cycle is definitely identified at all field stations as a control cycle by the mark on the first step. If the field start should happen to beat the control office start, so to speak, and get the back contact 75 of line relay LR open before relay CS picks up and sticks, then the operating cycle is positively designated at all locations as an indication cycle by the space character of the first code element.

*Synchronous operation of oscillators.*—In this system, the oscillators at the various locations are released by energization of the corresponding line relay. These line relays are connected across the line circuit, and to the extent that these line relays simultaneously open their back contacts, the oscillators are started in synchronism. In some applications and uses, the characteristics of the line circuit and variations in the operating times of these line relays may cause some differences in the synchronous release of the oscillators. Also, there may be some variations in the time between deenergization of an oscillator magnet OSM and the beginning of the step periods by operation of its contacts. In other words, while the oscillators may be adjusted to measure off with a high degree of accuracy equal step periods due to their torsional pendulum characteristics, there may be some variation in the releasing time and starting point of these step periods. For example, if the oscillator magnet OSM at one location is normally energized with more current than at another location, due to differences in supply voltage, the time required for effective release and initial movement of the armature of such oscillator magnet may be slightly longer.

In the system of this invention, the chopping relays EC and OC assure proper code reception in spite of such variations or differences in the exact synchronism between the step periods at the receiving point as defined by its oscillator, and the step periods of line circuit energization defined by the oscillator at the sending point. As previously explained, the response of code responsive means to the existing condition of the line relay is limited to a sampling or message period marked off by operation of the chopping relays EC and OC. These message periods exist only when the operation of a line relay and stepping relays are finished, and conditions are stabilized for proper code reception, even though the oscillator and step periods at the receiving point may lead those at the sending point.

Figure 15:
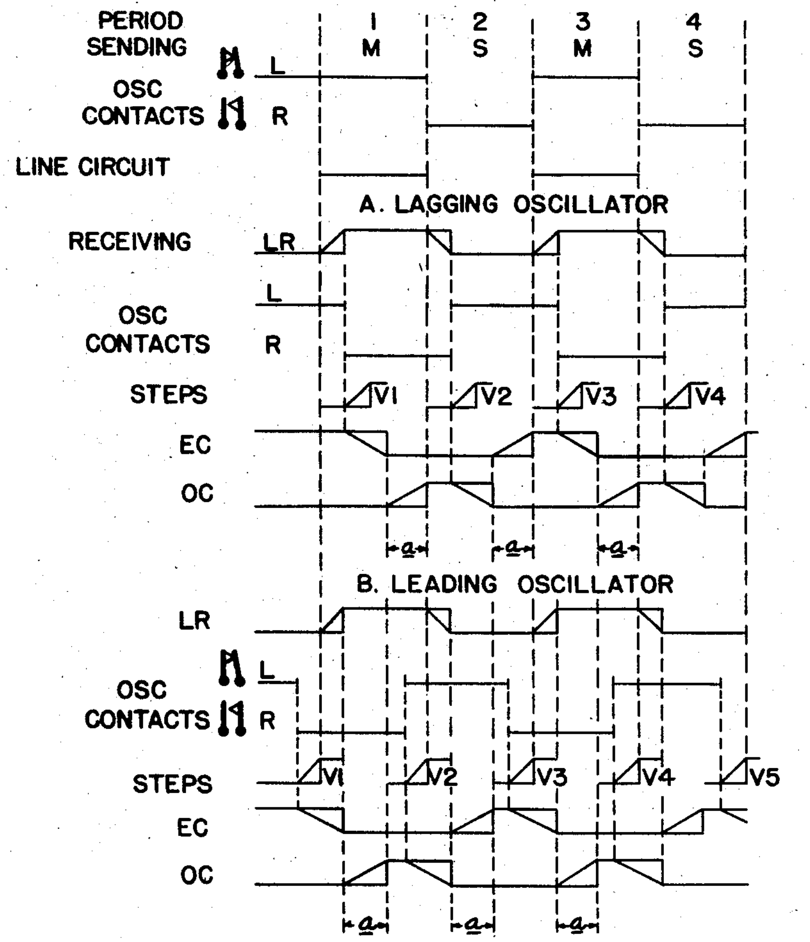
Fig. 15 is an explanatory time chart to illustrate the functioning of the system for extreme variations in the time relationship of oscillators at the sending and receiving points.

For the purpose of explaining this feature of the invention, the relay sequences for situations where the oscillator at a receiving station may be (A) lagging or (B) leading the sending oscillator are diagrammatically illustrated in Fig. 15. To simplify the explanation, it is assumed that the line circuit is controlled at the sending station for transmission of a mark, space, and mark, and that the line relay LR at the receiving station is operated in response to such change in the energization of the line circuit without any delay due to line circuit propagation or the like. There are two situations to be considered.

In the situation designated A, where the receiving oscillator is lagging behind the operation of the sending oscillator, it can be seen that the positioning of the line relay LR at the receiving station to designate the character of a code element may occur before the step period for that code element is set up at the receiving station. The chopping relays EC and OC, however, serve to postpone the beginning of the sampling or message period indicated by *a* until the proper channel circuit to use the existing condition of the line relay has been set up. For example, when a space is followed by a mark, as in the case of the step periods 2 and 3 as shown, the energization of relay LR at the receiving station to correspond with this mark, although actually occurring when the channel circuit for receiving the space of step period 2 is set up, is not improperly received, because a chopping relay, i.e. relay EC, is up at this particular time, and does not release to make up the message period for this mark, until the channel circuit to receive it is made up by energization of a stepping relay, i.e. relay V3.

Thus, it will be evident that the chopping relays EC and OC may be selected or adjusted to have operating times that will prevent cross-fire between code elements and channel circuits that might otherwise exist when a receiving oscillator is lagging behind the transmitting oscillator.

In the other situation designated B, where the receiving oscillator is assumed to lead the operation of the sending oscillator, the positioning of the line relay for a mark or space relating to a given step period in effect occurs after such step period is defined at the receiving station, and the corresponding channel circuit is set up. The message or sampling periods for utilizing the existing condition of the line relay, however, are not established by the chopping relays until the proper receiving channel circuits are established. For example, in the case of a mark followed by a space as indicated for step periods 1 and 2, the operation of the receiving line relay LR for the mark is carried over into the step period 2 at the receiving point, but the release of the chopping relay OC delays the message period *a* for this step period 2 until the line relay has released its armature, and assumed the proper condition for the space to be received during step period 2.

In accordance with the same principles and mode of operation, the chopping relays EC and OC will take care of line circuit propagation time, where the positioning of the line relay is slightly delayed after its energization or deenergization by operation of the oscillator contacts of the sending point. Such line propagation time may be significant in some cases, for example transmission in cable, and tends to create a situation tending to produce faulty code reception where code elements are transmitted over the line circuit in a direction opposite to the sequential release of operators by the initial line circuit energization. Such conditions may exist to a degree in the case where a plurality of field stations are ready to transmit new indications. The chopping relays EC and OC, however, may be selected or adjusted to provide the desired time margins for proper reception of code elements in spite of such variations. In this connection, it is evident that the oscillators may be readily adjusted or selected to provide the appropriate duration of the step periods to conform with the timing requirements for a given installation, and provide as rapid code communication as between the control office and the several field stations in a multiple station system as the characteristics of the line circuit and other operating conditions will permit.

For these reasons, the chopping relays EC and OC in the system of this invention perform useful functions in connection with the reception of code elements, as well as providing the desired sequential hold-over and testing circuits for the station selecting relays STR at the field stations.

*Communication channel modifications.*—In the specific embodiment of the invention previously discussed, it has been assumed that a line circuit, which is energized with direct current for marks, constitutes the channel of communication as between the control office and the various field locations. The appropriate mark and space character of code elements for the system of this invention may be created, however, by line carrier, or by radio or space radiation, when the appropriate energy sources and receivers for operation of the line relays are employed, and other minor modifications are made in the particular circuits previously described.

Fig. 16 illustrates diagrammatically a typical functional organization for carrier frequency energization of a line circuit. As shown, one winding of a coupling transformer 187 is capacity coupled by capacitors 188 to the line circuit, including if expedient a suitable filter 189, such as a band-pass filter for the particular frequency involved, where the line circuit is used for power or other communication facilities. The output circuit of a suitable generator of carrier frequency, designated GEN, which includes a conventional vacuum tube oscillator, voltage and power amplifiers in accordance with conventional practice, is connected to the other winding of the coupling transformer 187. The input circuit of a suitable receiver REC for the carrier frequency, which is capable of operating the line relay LR, and which includes an amplifier and rectifier in accordance with conventional practice, is similarly connected to said other winding of the coupling transformer 187.

Carrier frequency transmitters and receivers suitable for this purpose are disclosed, for example, in the prior application of Barker et al., Ser. No. 154,848, filed April 8, 1950.

In line carrier systems of this character, the sensitivity of the vacuum tube type of carrier frequency receiver employed makes it desirable to avoid excitation of the receiver directly from the associated local generator. The receiver input circuit may be isolated from the line circuit at the time the generator output circuit is connected to the line circuit to obviate such direct excitation of the receiver by its local generator; but in the case of line carrier, and also space radiation as shown in Fig. 17, it is preferable to control the supply of plate voltages to the generator and receiver alternately, because of the extraneous couplings commonly found in practice tending to make a sensitive receiver improperly excited from an associated active transmitter or generator.

In the arrangement illustrated, the supply of plate voltage to the generator GEN and receiver REC is controlled by front and back contacts 192 and 193 of the transmitter relays 1–EMT and 1–OMT, in combination with the oscillator contacts L2 and R2, in such a way that the plate supply voltage normally connected to the receiver is cut off whenever the local generator or transmitter is rendered effective to transmit a mark by supplying plate voltage to it. In the normal condition shown, the source of plate supply voltage indicated by (B+) is connected through oscillator contact L2, back contact 192 of transmitter relay 1–EMT, to the receiver REC, so that under the normal inactive conditions of the system, the receiver is effective to receive from other stations. If, under such normal conditions, transmitter relay 1–EMT is energized to initiate operation of the system, the plate supply voltage (B+) is cut off from the receiver REC by opening of the back contact 192 of relay 1–EMT, and this plate supply voltage (B+) is supplied through this front contact 192 to the generator GEN. Similarly, as can be readily understood, when the oscillator contacts L2 and R2 alternately open and close to render the transmitter relays 1–EMT and 1–OMT effective to provide marks or spaces, as the case may be, the plate supply voltage is cut off from this receiver REC whenever the oscillator contacts and transmitter relays are operated to provide a mark, with the result that there is no objectionable cross-excitation of the receiver by its local generator.

Fig. 17 illustrates a similar functional organization for using radio or space radiation for the communication channel. An antenna 195, shown conventionally, is connected to the coupling of transformer 187; and the generator GEN and the receiver REC take a conventional form of radio transmitter and receiver units, operated with frequency or amplitude modulation of a carrier frequency available for such service, all in conformity with well known principles and practices in a manner familiar to those skilled in the art.

Figure 18:
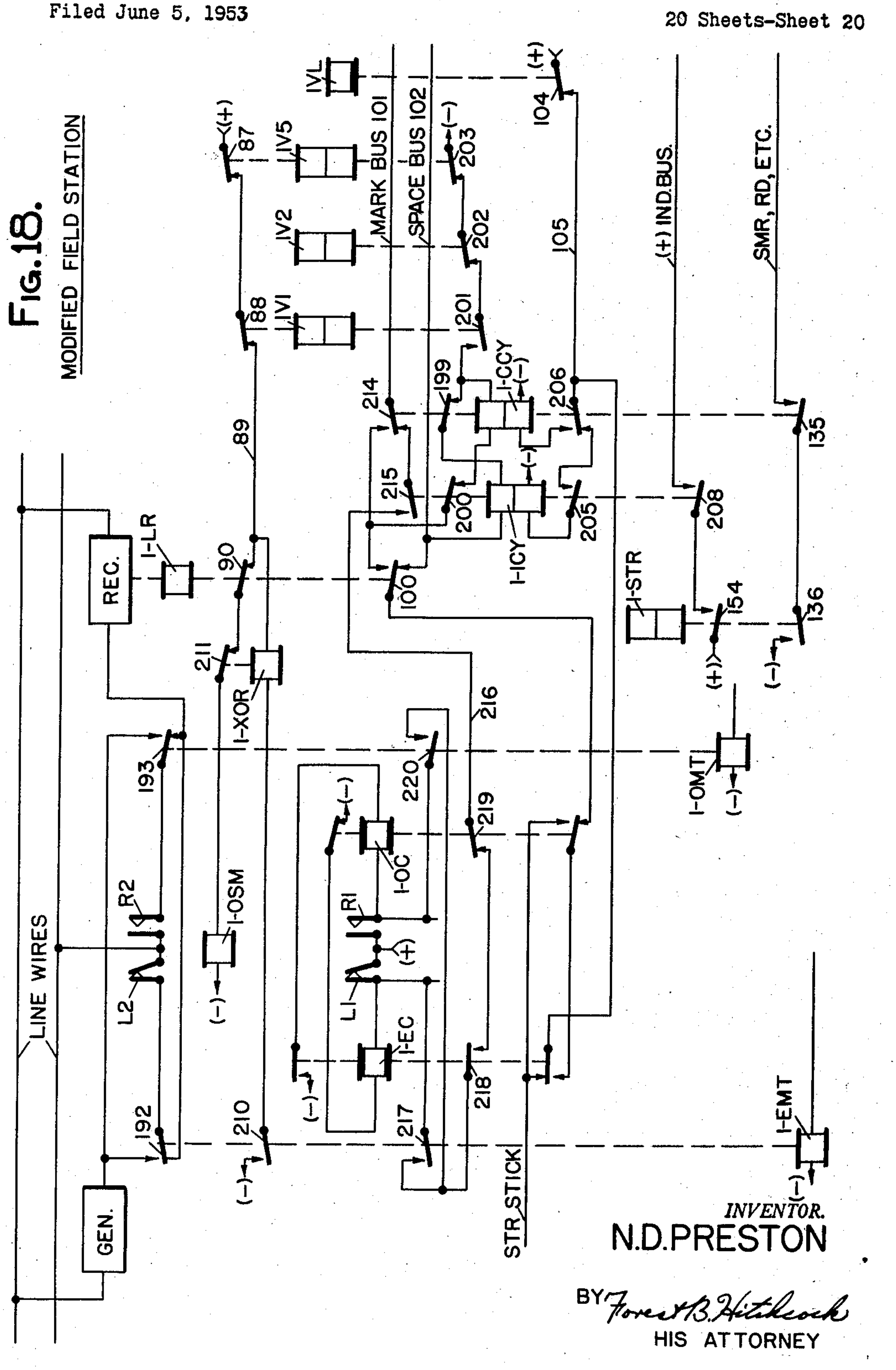
Fig. 18 illustrates a modified organization of circuits for a typical field station suitable for the line carrier or space radiation communication channels of Figs. 16 and 17.

The modified communication channels of Figs. 16 and 17 provide sources of energy and line relay operation suitable for use without change with the control office apparatus shown in Figs. 2A and 2B, but the isolation of the receiver REC from its local generator GEN calls for a modification of the field station apparatus, such as shown in Fig. 18. Incidentally, this modified field station apparatus of Fig. 18 may be used in the main embodiment of the invention previously explained, if and when it is desired to disconnect the line relay at the field stations, such as line relay 1–LR, entirely from the line circuit, whenever local battery B is connected to line circuit.

*Field station modification.*—Fig. 18 illustrates a modified organization of relays and circuits for a typical field station, in which the line carrier or space radiation receiver REC operating the line relay 1–LR is isolated when the local energy source or generator GEN is operating. In the showing of Fig. 18, it is assumed that the generator GEN and receiver REC are alternately connected directly to the line circuit by operation of the oscillator contacts L2 and R2, and back contacts 192 and 193 of the transmitter relays 1–EMT and 1–OMT, rather than by controlling the plate supply voltage to these devices, as illustrated in Figs. 16 and 17. Functionally, the result is the same, and the showing of Fig. 18 is employed to make it clear how a battery B and a line relay 1–LR directly connected with the line circuit can be used, if desired, with this modified form of field station apparatus.

The modified field station apparatus of Fig. 18 also illustrates how the function of cycle selection, performed by a single relay such as 1–CS in the typical field station previously described, may be performed to advantage by two separate relays 1–ICY for an indication cycle, and 1–CCY for control cycle. In practice, the use of two cycle selector relays at the field stations, such as 1–ICY and 1–CCY, has the advantage that a fault in the pick-up or stick circuits of relay 1–CCY for a control cycle does not leave the station effective to transmit indications, thereby preventing code mutilation that might happen if a single relay such as 1–CS failed to pick up or stay up when it should.

Briefly describing the circuits in Fig. 18 for the cycle selector relays 1–ICY and 1–CCY, one terminal of the upper winding of these relays is connected through a back contact 199, 200 of the other relay to the space and mark buses 102, 101 respectively; and the other terminals of these windings are connected to (−), through a front contact 201 of stepping relay V1, and back contacts 202 and 203 in series of stepping relays V2 and V5, to (−) (corresponding in function to the contacts 108, 109 and 110 in the energizing circuit of relay 1–CS of Fig. 10). Either one of these relays 1–ICY and 1–CCY, when initially energized at the beginning of an indication or control cycle respectively, is maintained energized by a stick circuit through its front contact 205 or 206, wire 105, and back contact 104 of relay VL, substantially the same as the stick circuit for the relay 1–CS of Fig. 10.

When relay 1–CCY is energized to designate a control cycle, the closure of its front contact 135 permits operation of the code responsive relays SMR, RD, etc., subject to the energized condition at the time of station relay 1–STR and closure of its front contact 136, in the same way previously described. When relay 1–ICY is energized to designate an indication cycle, the closure of its front contact 208 permits energization of the (+) indication bus 155 of Fig. 11, subject to the closed condition of the front contact 154 of the station relay 1–STR, with the same results as previously explained.

The primary purpose of the modification of Fig. 18 is to permit the line relay 1–LR to be isolated from the line circuit whenever the associated local energy source is used to apply energy to the line circuit. Reviewing the operation of the system of this invention, as previously described for direct current energization of the line circuit, it will be noted that the energization of the line relay such as 1–LR at each field station is employed to perform the functions of (*a*) releasing the oscillator for that station at the beginning of an operating cycle, (*b*) reception of station code and control codes from the control office during a control cycle, and (*c*) reception of marks during the station selecting portion of an indication cycle to maintain the associated station relay such as 1–STR energized, as and when the station code call is applied to the line circuit by the station itself.

Considering how these conditions for line relay operation at the field stations may be artificially satisfied without leaving the line relay operatively connected with the line circuit whenever the local energy source is used, when the transmitter relay 1–EMT is energized for a field start, the closure of front contact 210 of this relay energizes an extra oscillator releasing relay 1–XOR over a circuit which may be traced from (+), through back contact 87 of stepping relay V5, back contact 88 of relay V1, wire 89, relay 1–XOR, front contact 210 of relay 1–EMT, to (−). Such energization of the relay 1–XOR and opening of its back contact 211 opens the normal energizing circuit for the oscillator magnet 1–O3M, the same as the opening of the back contact 90 of line relay 1–LR would do. The pick-up time for this extra relay 1–XOR may be made to match the pick-up time of the line relays at other stations, so that the oscillators are simultaneously released at the various locations.

Considering the next condition where line relay operation at a field station is needed, i.e. during a control cycle, it can be readily seen that the transmitter relays 1–EMT and 1–OMT are not operated under these conditions, because the cycle selector relay 1–ICY for indication cycles is not then energized to close its front contact 208 (corresponding with back contact 150 of relay 1–CS, Fig. 11, in the station apparatus previously explained). In short, the transmitter relays 1–EMT and 1–OMT at the field stations do not operate during a control cycle, and hence there is no occasion to isolate the line relay 1–LR from the line circuit, leaving it responsive to the mark or space character of the code elements transmitted during such control cycle.

Considering now the case where the energization of the line relay at a field station is used to respond to a mark code element applied by that station in connection with the station selecting portion of an indication cycle, the energization of the mark bus 101, for the purpose of maintaining the station relay 1–STR energized under such condition, may be accomplished artificially through contacts of the transmitter relays 1–EMT and 1–OMT. In other words, a transmitter relay 1–EMT or 1–OMT is energized by the channel circuits and code jumper connections previously discussed when the field station in question creates a mark to reject inferior stations and register itself in the control office. This same mark condition may be artificially created during the sampling or message period by the use of back contacts in series of the chopping relays 1–EC and 1–OC and front contacts of transmitter relays 1–EMT and 1–OMT.

Referring to Fig. 18, such artificial energization of the mark bus 101 is called for during an indication cycle, but not during a control cycle. Accordingly, a front contact 214 of control cycle relay 1–CCY connects the mark bus 101 to the front contact 100 of line relay 1–LR for control cycles. In the case of an indication cycle, this mark bus 101 is connected through back contact 214 of relay 1–CCY and front contact 215 of the indication cycle selector relay 1–ICY to a wire 216, to which (+) energy is supplied during the message period whenever the station in question is transmitting a mark. Assume, for example, that the station in question calls for a mark on step period 2. Under such conditions, the transmitter relay 1–EMT is energized during step period 1 (see Fig. 7B) closing a front contact 217. When the oscillator swings to the left and closes contacts L2 to transmit this mark, the oscillator contacts L1 also close, and (+) is supplied through said contacts L1, front contact 217 of relay 1–EMT, back contacts 218 and 219 in series of relays 1–EC and 1–OC to wire 216 and thence to the mark bus, thereby creating during the sampling or message period the energization of the mark bus 101 required to maintain station relay 1–STR energized. The same operation occurs for the next mark code element provided by pre-setting relays 1–OMT, using the front contact 220 of this relay and the oscillator contacts R1, in a manner that will be apparent without specifically tracing these circuits.

Incidentally, the mark code bus 101 is also artificially energized when mark code elements for indications are transmitted during the latter part of the indication cycle; but under these conditions the control cycle selector relay 1–CCY is deenergized, and its front contact 135 is open, so that the code responsive relays SMR, RD, etc. are not affected by such energization of the mark bus 101.

The local energy source GEN is not used for the space code elements of the station code call of the station in question, and hence its receiver REC may be left effective to respond to mark energizations from other stations, and operate line relay 1–LR, if necessary, to reject this station by releasing its station relay 1–STR. In other words, the artificial energization of the mark bus, independently of the line relay 1–LR, in the manner just explained, occurs only when the station in question is exercising its code superiority. The system thus operates to establish the desired priority or preference to a plurality of field stations ready to send indications, and register the surviving station in the control office, in the same way as if the line relay 1–LR were energized by its own local source for the mark code elements.

The modified field station apparatus of Fig. 18 in other respects is the same as previously described, and to make this more readily appreciated various relays and circuit connections found in Figs. 3A and 3B, 9, 10 and 11 are not shown in Fig. 18.

From the foregoing, it can be seen that this modified field station apparatus of Fig. 18 permits isolation of the line relay or its receiver REC from the communication channel whenever the local energy source or generator GEN is being used for excitation of this communication channel, thereby avoiding improper or undesirable energization of the line relay or its receiver by its associated local energy source. Among other things, this permits use of a line carrier or space radiation for the communication channel as between the control office and the various field locations in an acceptable manner.

Summarizing, the combined effect of the various function and features characteristic of this invention results in a multiple station code communication system, capable of performing the desired communicating functions rapidly and with appropriate timing margins to satisfy the operating conditions in practice.

In this type of system, the control office may be located at any convenient geographic location with respect to the various field stations. If expedient, as sometimes is the case for the remote control of interlockings, the various field stations may be distributed on branches of the line circuit extending in different directions from the control office. In other words, so long as the control office and the various field stations are effectively connected by a communication channel, either by line wires or by space radiation, the system will function to select one station at a time for the reception of controls or the transmission of indications, regardless of the relative geographic locations of the field stations with respect to the control office. In this respect, the system of this invention is distinctive from other types of code communication systems requiring a predetermined geographic relationship of the field stations with respect to the control office for providing the preference or priority as between a plurality of field stations ready at the same time to transmit new indications.

In the system of this invention, the line circuit is not energized while the system is inactive, as in some systems of this character. The field stations provide field starts by applying their local energy, and do not require energization of the line circuit for this purpose. This represents a useful saving in power, since under ordinary conditions the system is actually in use for such a small part of the time. Also, the stepping oscillators at all locations are simultaneously released upon energization of the line circuit by energy applied at any field station, or at the control office. Simultaneous release of the stepping oscillators is a desirable characteristic of any multiple station system of the so-called syncrostep type, in which the stepping relays are operated by such oscillators, rather than by stepping pulses on the line circuit.

One significant feature of this system is the use of local releasable and restorable oscillators, or equivalent time measuring devices, to define the step periods for mark or space code elements as determined by a presetting of even and odd transmitter relays EMT and OMT, together with chopping relays EC and OC timed by such oscillators for establishing sampling or message periods to conform with the existing conditions and assure proper reception of code elements. The system of this invention also involves novel and useful expedients in connection with station selection by a single station relay such as 1–STR for both controls and indications, a stepping relay bank operating by repeat operation to set up one less channel circuit than twice the number of stepping relays, and other circuit organizations, all cooperating to obtain many useful operating functions out of a limited number of relays. Further, the system is applicable without material change to various types of communication channels as between a control office and a plurality of field locations, including direct current energization of a single circuit, line carrier, or space radiation.

In some respects, the specific arrangement and organization of relays and circuits shown and described represent essential elements of the system of this invention, and in other respects what is shown is merely typical or representative of suitable facilities for the purpose, as for example, the arrangements shown for control office and field starts, registration of control codes, station registration, and control of indication devices in the control office. These instrumentalities, which in a sense are ancillary to a code communication system proper, and which are well known parts of a complete installation of other types of code communication systems, may take any one of the various conventional forms suitable for the purpose. Further, various modifications may be made in the particular arrangement of circuits illustrated, without departing from the basic function and mode of operation characteristic of the invention.

What I claim is:

1. A multiple station code communication system comprising in combination, a communication channel connecting a number of different locations including a control office and a plurality of field stations, a releasable self-propelled time interval device at each location operable to define like step periods of time, means for releasing said devices only in response to the initial energization of said communication channel, a bank of stepping relays at each location, circuit means for sequentially operating said stepping relays by the associated time interval device for establishing channel circuits for the transmission and reception of a series of code elements, and transmitting means at each location including a local source of energy for initially energizing said communication channel while the system is inactive and thereby cause simultaneous release of the time interval devices at the various locations, said transmitting means acting to govern the energization of said communication channel during successive step periods for transmission of a station selecting code and the code elements for controls or indications relating to the selected field station.

2. A multiple station code communication system according to claim 1 wherein the energization of said communication channel by said transmitting means at each field station is by carrier current.

3. In a multiple station code communication system of the character described for the transmission of controls and indications to and from different locations including a plurality of field stations and a control office one field station at a time, a line circuit connecting a number of different locations including the control office and the field stations, a line relay at each field station connected across said line circuit, a releasable oscillatory time device at each location, a bank of stepping relays at each location locally operated by said releasable oscillatory time interval device at the associated location independent of the energization of said line circuit, means responsive to an initial energization of any line relay while the system is idle for releasing the associated time interval device, and means at each location including a local source of energy for energizing said line circuit and thereby causing simultaneous release of the time interval devices at all other locations for an operating cycle of code transmission.

4. In a start-stop-code communication system for transmission of controls or indications during an operating cycle as between a central control station and a selected one of a plurality of remote field stations at different locations, means at each station including a bank of stepping relays and a self-propelled releasable and restorable time interval device for establishing distinctive channel circuits for the transmission and reception of a series of code elements of variable character, a communication channel connecting said stations, means including said communication channel operable only in response to the initial energization of said communication channel to release said devices simultaneously, station including a source of energy and operable while the system is at rest to initiate an operating cycle by energizing said communication channel and thereby render effective the release of said time interval devices at all stations, and means for automatically restoring each time interval device individually when the associated stepping relays have completed a prescribed number of steps.

5. In a start-stop code communication system of the character described, a line circuit connecting a number of different locations including a control office and a plurality of field stations, means at each location including a bank of stepping relays and a self-propelled releasable and restorable oscillator for sequentially establishing channel circuits for the transmission and reception of a series of code elements, transmitting means at each location including a source of energy and operable when transmission from that location is called for to cause initial energization of said line circuit, a line relay at each location connected across said line circuit, means acting in response to the initial energization of each of said line relays to release the associated oscillator, circuit means for controlling said transmitting means at a location acting as a sending station in accordance with the character of the code elements to be transmitted for a control or indication cycle, and means for restoring each oscillator individually to its normal condition after the associated stepping relays have completed the number of steps prescribed for a control or indication cycle.

6. In a code communication system of the character described, a communication channel connecting a number of different locations including a local office and a plurality of field stations, a self-propelled time interval device at each location, circuit means for rendering said time interval devices normally inactive and releasable by energization of said communication channel while the system is inactive to define a series of like step periods, apparatus at each field station including changeable devices to be indicated in the control office, and means responsive to a change in the existing condition of said devices at any field station for energizing said communication channel to provide a field start condition at the control office and simultaneous release of the time interval devices at all locations.

7. In a multiple station code communication system of the character described, a normally deenergized line circuit connecting a number of different locations including a control office and a plurality of field stations, code transmitting and receiving means at each location including a normally inactive releasable oscillator, circuit means for releasing said oscillator only by the energization of said line circuit while the system is inactive to provide a predetermined number of step periods for transmission and reception of code elements, manually operable start means at the control office for initially energizing said line circuit for a control cycle, means at each field station responsive to a change in the condition of devices to be indicated in the control office for also energizing said line circuit for a field start, cycle designating means at each field station to condition its apparatus to receive controls from the control office or to send indications, and means at the control office operable in accordance with the time priority of said manually operable start means and the reception of a field start for governing the cycle designating means at the field station, whereby operating cycles initiated by manual or field starts are identified at all locations as relating to the transmission and reception of either controls or indications.

8. A multiple code communication system of the synchrostep type characterized by the operation of stepping relays at the various locations by local releasable oscillators, a normally deenergized communication channel connecting a number of spaced locations including a control office and a plurality of field stations, transmitting means at each location including a local source of energy for applying field start energy over said communication channel to all other locations, said transmitting means at a location when conditioned to send also acting to apply to said communication channel code elements of a character varied in accordance with station codes and the controls or indications transmitted to or from a field station selected by such station code, and circuit means responsive only to the application of said field start energy to the communication channel for simultaneously effecting the release of the oscillators at all stations.

9. In a start-stop multiple station syncrostep system, a communication channel connecting a number of different locations including a control office and a plurality of field stations, means at each location including stepping relays and a self-propelled releasable oscillator for establishing sequential channel circuits for the transmission and reception of code elements, transmitting means at each location including a local source of energy for governing the energization of said communication channel to provide starts while the system is at rest, means responsive to the energization of said communication channel when the system is at rest for simultaneously releasing the oscillators at all stations, and circuit means at each location effective when that location is a sending station for controlling its transmitting means to cause energization of said communication channel in accordance with the character of the code elements of a station code of a particular field station and the controls or indications relating to that field station.

10. In a start-stop code communication system for transmission of controls and indications during operating cycles between a control office and any selected one of a plurality of field stations at different locations, a bank of stepping relays at each location operable to establish distinctive channel circuits for the transmission and reception of a series of code elements including station codes respectively characteristic of said field stations, a releasable and restorable self-propelled time interval device at each location for sequentially operating said stepping relays and defining predetermined step periods, a line circuit connecting said control office and said field stations, a line relay for each location responsive to interwire potentials across said line circuit, circuit means at each location for releasing the associated timing device only in response to the initial energization of the associated line relay, transmitting means at each location including a local source of energy and governed by the channel circuits established by the associated banks of stepping relays for controlling the energization of said line circuit, and means including said source of energy at each location for initially energizing said line circuit while the system is at rest to release the time interval devices simultaneously at all locations to initiate an operating cycle.

11. In a multiple station code communication system of the character described, a line circuit connecting a number of different locations including a control office and a plurality of field stations, a line relay at each location connected across said line circuit and responsive to its energized or deenergized condition from time to time, said line circuit and said line relays being normally deenergized while the system is at rest, means at each location including a bank of stepping relays and a self-propelled releasable oscillator for establishing sequential channel circuits during an operating cycle for the transmission and reception of a mark or space character of a series of code elements, transmitting means at each location including a local source of energy and operable to provide an initial start energization of said line circuit, means at all locations responsive to the initial energization of the associated line relays for simultaneously releasing the oscillators at all the locations for an operating cycle, and circuit means for governing said transmitting means at a sending location in accordance with the mark or space character of a station code allocated to a particular field station and the controls or indications to be transmitted to or from that field station.

12. In a multiple station code communication system of the character described, in combination with a communication channel connecting a number of different locations including a control office and a plurality of field stations sequentially in order according to their geographic locations, means at each field station including a bank of stepping relays operated by a local time interval device and operable to transmit over said communication channel to the control office and to all other field stations a series of code elements representing a station code characteristic of that station, the assignment of station codes to the different stations being independent of the relative geographic location of the stations with respect to the control office, receiving means at each field station responsive to the code elements applied to said communication channel by other field stations, line relays at the stations connected in multiple across said communication channel and station selecting means at each field station including contacts of said stepping relays and contacts of said line relays at the associated station initially rendered effective by a change in the condition of a device to be indicated and rendered ineffective whenever the character of a station code element as applied to said communication channel fails to match the station code allocated to that station, whereby the priority between the plurality of field stations having new indications to transmit is established one station at a time in accordance with the relative superiority of the station codes allocated to such stations and independently of the geographic location of the field stations with respect to each other or the control office.

13. In a multiple station code communication system of the character described, a communication channel, field station apparatus at each of a plurality of different locations connected by said communication channel and including channel circuits sequentially established by a local oscillator, certain of said channel circuits including code jumpers characteristic of a particular station code allocated to the corresponding field station, a single station selecting relay for selecting the station to receive controls or transmit indications, and means controlling said station selecting relay in accordance with the station code of the corresponding field station and the station code being received at that station from the control office or some other field station having new indications to transmit.

14. In a multiple station code communication system of the character described for transmitting controls or indications during an operating cycle between a control office and a selected one of a plurality of field stations at different locations, apparatus at each field station comprising, a cycle selector relay, means for energizing said cycle selector relay during a control cycle, relay means subject to actuation in response to a change in the existing condition of devices to be indicated in the control office, a single station selecting relay permitting reception of controls or transmission of indications for the corresponding field station, and circuit means responsive to the energization of said cycle selecting relay or said change responsive relay means for temporarily energizing said station relay at the beginning of an operating cycle.

15. A code communication system for transmitting controls or indications by direct current or carrier frequency energization of a line circuit or by space radiation between any two selected stations at a number of different locations including a control office and a plurality of field stations, said system comprising a communication channel connecting the various locations, means at each location including a releasable and restorable oscillator for establishing sequential channel circuits for the transmission and reception of successive code elements, transmitting means at each location including a source of energy for providing a starting energization of the communication channel while the system is at rest, means responsive to said starting energization of the communication channel for releasing the oscillators at all locations to initiate an operating cycle of transmission from such location, means including cycle designating relays at the field locations and devices in the control office for designating each operating cycle as a control cycle or indication cycle dependent upon the time priority of control office and field starts, station selecting means at each field station for identifying that station to receive controls or transmit indications, said station selecting means being conditioned at the beginning of each control cycle and at the beginning of each indication cycle originating at the corresponding field station, and means for maintaining said station selecting means at any given field station in its active condition only when the station code on the code communication channel corresponds with a particular station code allocated to the corresponding field station.

16. In a code communication system of the character described for transmission of a series of code elements from a sending location to a receiving location over a line circuit during step periods determined locally independently of said line circuit, a releasable oscillator at each location operable to define a succession of like step periods, a bank of stepping relays at each location, circuit means for sequentially operating said stepping relay at intervals determined by the associated oscillator, a pair of transmitter relays at the sending location, circuit means for alternately conditioning said transmitting relays over channel circuits established by the associated stepping relays in accordance with the character of the successive code elements to be transmitted, and circuit controlling means actuated by the oscillator at the sending location for rendering the contacts of each transmitter relay conditioned during a given step period effective to control the line circuit during the next succeeding step period.

17. In a code communication system of the character described characterized by the synchronous operation of stepping relays at sending and receiving stations by local oscillators, a line circuit connecting a sending station and a receiving station, a line relay at the receiving station connected to the line circuit, apparatus at the sending station comprising odd and even transmitter relays and circuit controlling means actuated by the associated oscillator for rendering said transmitter relays alternately effective to control said line circuit, and apparatus at the receiving station including contacts of said line relay for governing the energization of code responsive devices respectively in accordance with the condition of energization of said line circuit during successive step periods, and chopping means at the receiving station governed by the associated oscillator for rendering said line relay effective to control a code responsive device only during a predetermined message interval of the corresponding step period.

18. In a code communication system of the type described characterized by the operation of stepping relays at sending and receiving locations by a local oscillator, the combination with local releasable self-propelled oscillators at the sending location and at the receiving location operable when released for defining a succession of like step periods, a line circuit connecting said locations, means including said line circuit synchronously releasing the oscillators, a bank of stepping relays at each location, means for sequentially operating the stepping relays of the associated oscillator, a source of energy and a pair of transmitter relays at the sending location, means for alternately conditioning said transmitter relays over channel circuits established by the associated stepping relays in accordance with the character of the code elements to be transmitted, means at the sending location controlled by its oscillator for rendering the energized or deenergized condition of said line circuit from said source effective during a given step period dependent upon the transmitter relay conditioned during the next preceding step period, a line relay at the receiving location subject to energization by said line circuit, a bank of decoding relays at the receiving location, means at the receiving location including channel circuits established by the associated stepping relays for rendering said code responsive relays respectively responsive to the condition of said line relay during a step period, and means at the receiving location governed by its oscillator for establishing a message period during an intermediate part of each step period for the control of the corresponding code responsive relay by said line relay.

19. In a multiple station code communication system of the character described, a communication channel connecting a number of different locations including a control office and a plurality of field stations, means at each location including a self-propelled oscillator releasable at the beginning of each operating cycle for establishing sequential channel circuits for the transmission and reception of successive code elements, means at each location designating it as a sending or receiving station, transmitting means at a sending station including a source of energy for governing the energization of said communication channel to form a series of code elements of a controllable character for station selection and controls or indications, means at a receiving station including a line relay responsive to the condition of said communication channel, code responsive relays at a receiving station, circuit means for selectively actuating said code responsive relays individually in accordance with the character of the code elements being applied to said communication channel as indicated by the condition of said line relay, and chopping means governed by the associated oscillator for defining a message period during each step period for the operation of the code responsive relays.

20. In a code communication system of the syncrostep type characterized by self-propelled time interval devices concurrently operated at the several stations during an operating cycle of the system to define like step periods, a sending station and a receiving station a communication channel connecting said sending and receiving stations, means at the sending station controlled by its time interval device for creating throughout the respective step periods a controllable condition of said communication channel representing distinctive code elements, and receiving apparatus at the receiving station comprising a line relay responsive to the condition of said communication channel from time to time, a number of code responsive devices, circuit means for operating said code responsive devices in accordance with the character of the successive code elements, and means including contacts controlled by the associated time interval device for rendering said code responsive devices responsive to the existing condition of said line relay during a predetermined message period in each step period.

21. In a code communication system of the character described having a sending station and a receiving station connected by a line circuit, self-propelled oscillators at said stations, means for operating said oscillators concurrently during an operating cycle of the system to define a series of like step periods, transmitting apparatus at the sending station including odd and even transmitter relays and means operated by the associated oscillator for rendering said transmitter relays alternately effective to control the energization of said line circuit, receiving apparatus at the receiving station comprising a line relay responsive to the energization of said line circuit, code responsive devices, circuit means for operating said code responsive devices in accordance with the condition of said line relay during successive step periods, and chopping means controlled by the associated oscillator for operatively connecting contacts of said line relay with a given code responsive device for a predetermined message period during the corresponding step period.

22. A multiple station code communication system comprising in combination, a normally deenergized line circuit connecting a number of locations including a control office and a plurality of field stations, a transmitter including a generator of carrier frequency at each location for applying selected carrier frequency pulses to said line circuit, a receiver at each location responsive to such carrier frequency on said line circuit, relay means at each location operated in response to the application of the carrier frequency code elements to said line circuit, means at each location including a normally inactive time interval device operable when initiated to define equal step periods for successive code elements constituting a cycle of operation, said transmitter at each field station being operable for initially energizing said line circuit while the system is inactive and thereby cause simultaneous initiation of the time interval devices at the various locations, station selecting means at the field stations having their operation dependent upon code elements received from the control office or other field stations, means for isolating the carrier frequency receiver at each field station from the influence of energization of said line circuit while the associated transmitter is active, and means for operating the receiver relay at a field station each time its associated transmitter is active during the station selecting step periods of an indication cycle involving that station.

23. In a code communication system of the character described for transmitting a series of code elements from a sending location to a receiving location over a line circuit, a bank of stepping relays at each location, a releasable oscillator at each location for locally operating sequentially the associated bank of stepping relays independently of the energization of said line circuit, means including said stepping relays for establishing distinctive channel circuits at the sending location for governing the character of the successive code elements to be applied to said line circuit, said means at the receiving location establishing channel circuits for receiving such code elements, a pair of transmitter relays at the sending location, circuit means selected by said stepping relays for subjecting said transmitting relays alternately during respective steps to selective energization over the channel circuits established by the associated stepping relays in accordance with a code selected for transmission, and means at the sending location governed by the associated oscillator for rendering the transmitter relays as conditioned during the respective step periods effective to control said line circuit alternately during the respective step periods, whereby the step periods defined by the time interval devices at the sending and receiving locations may be used for the transmission of code elements having their character determined by channel circuit energization and relay operation during a preceding step period.

References Cited in the file of this patent

UNITED STATES PATENTS

| | | |
|---|---|---|
| 2,045,713 | Judge | June 30, 1936 |
| 2,141,551 | Phinney | Dec. 27, 1938 |
| 2,152,010 | Zenner | Mar. 28, 1939 |
| 2,368,826 | Hailes | Feb. 6, 1945 |
| 2,399,738 | Howe | May 7, 1946 |
| 2,411,375 | Jackel | Nov. 19, 1946 |
| 2,567,226 | McWhorter | Sept. 11, 1951 |
| 2,626,314 | Coley | Jan. 20, 1953 |
| 2,679,034 | Albrighton | May 18, 1954 |
| 2,786,938 | Coley | Mar. 26, 1957 |